US012739023B2

(12) United States Patent
Nesteroff et al.

(10) Patent No.: US 12,739,023 B2
(45) Date of Patent: Sep. 15, 2026

(54) SERVICE MANAGEMENT AND ORCHESTRATION (SMO) OF SATELLITE ACCESS NETWORKS WITHIN A NETWORK SLICE

(71) Applicant: Juniper Networks, Inc., Sunnyvale, CA (US)

(72) Inventors: Lyubov Nesteroff, Pleasant Hill, CA (US); Ojas Gupta, Mountain View, CA (US); Arda Akman, San Ramon, CA (US); Georgios Oikonomou, Patra (GR)

(73) Assignee: Hewlett Packard Enterprise Development LP, Spring, TX (US)

(*) Notice: Subject to any disclaimer, the term of this patent is extended or adjusted under 35 U.S.C. 154(b) by 502 days.

(21) Appl. No.: 18/354,464

(22) Filed: Jul. 18, 2023

(65) Prior Publication Data

US 2024/0413892 A1 Dec. 12, 2024

(30) Foreign Application Priority Data

Jun. 12, 2023 (GR) .............................. 20230100465

(51) Int. Cl.
*H04W 48/18* (2009.01)
*H04B 7/185* (2006.01)
(Continued)

(52) U.S. Cl.
CPC ..... *H04B 7/18519* (2013.01); *H04B 7/18513* (2013.01)

(58) Field of Classification Search
CPC ............ H04B 7/18519; H04B 7/18513; H04B 7/18528; H04B 7/18545; H04B 7/1851;
(Continued)

(56) References Cited

U.S. PATENT DOCUMENTS 10,211,909 B2 * 2/2019 Vargas ............... H04B 7/18513
11,031,999 B1 * 6/2021 Liu ......................... H04L 67/61
(Continued)

OTHER PUBLICATIONS

"3rd Generation Partnership Project; Technical Specification Group Services and System Aspects; Service Requirements for the 5G system; Stage 1 (Release 19)" 3GPP, Mar. 31, 2023, 116 pp.
(Continued)

*Primary Examiner* — Edan Orgad
*Assistant Examiner* — Vanneilian Lalchinthang
(74) *Attorney, Agent, or Firm* — Shumaker & Sieffert P.A.

(57) ABSTRACT

An example network provisioning system is configured to obtain one or more network slice subnet templates (NSSTs), including a template for a satellite access network (SAN) and, optionally, a template for a terrestrial access network (TAN). The network provisioning system defines a network slice template (NST) based on the one or more NSSTs. The network provisioning system deploys a network slice in accordance with the NST to enable service management and orchestration of the network slice including the SAN. The network provisioning system is configured to execute a user interface configured to display a representation of the network slice comprising the SAN. The network provisioning system is configured to receive via the user interface an indication to add a base station provided by a satellite and modify the network slice based in part on the selection. In some examples, the network slice is a 5G communications network slice.

19 Claims, 31 Drawing Sheets

(51) Int. Cl.
*H04B 7/195* (2006.01)
*H04L 12/24* (2006.01)

(58) Field of Classification Search
CPC .. H04B 7/1853; H04B 7/18558; H04B 7/195; H04W 24/02; H04W 28/0268; H04W 48/16; H04W 48/18; H04W 48/04; H04W 48/20; H04W 84/06; H04L 41/5045; H04L 41/5035; H04L 43/091; H04L 43/20
USPC .......................................................... 370/316
See application file for complete search history.

(56) References Cited

U.S. PATENT DOCUMENTS 11,115,920 B1 * 9/2021 Seetharaman ........ H04W 24/08
2016/0246784 A1 * 8/2016 Chakerian ............. G06F 16/282
2018/0324602 A1 * 11/2018 Griot ..................... H04W 48/20
2022/0330093 A1 * 10/2022 Rahman ................ H04L 47/125
2022/0353138 A1 * 11/2022 Wyszkowski ......... H04L 41/084
2023/0010527 A1 * 1/2023 Viswambharan ..... H04W 24/10
2023/0045460 A1 * 2/2023 Ho ........................ H04W 88/18
2023/0224025 A1 * 7/2023 Lin .................. H04W 56/0035
455/12.1
2023/0362305 A1 * 11/2023 Kim .................. H04W 28/0268
2023/0379785 A1 * 11/2023 Osborn ............. H04W 36/0033
2024/0106530 A1 * 3/2024 Li ...................... H04B 7/18558

OTHER PUBLICATIONS

"3rd Generation Partnership Project; Technical Specification Group Services and System Aspects; System architecture for the 5G System (5GS); Stage 2 (Release 17)" 3GPP, Mar. 2021, 489 pp.
Griffith et al., "The Role of Satellites in 5G Networks", https://www.wilsoncenter.org/article/role-satellites-5g-networks, Wilson Center, Oct. 1, 2021, 15 pp.

* cited by examiner

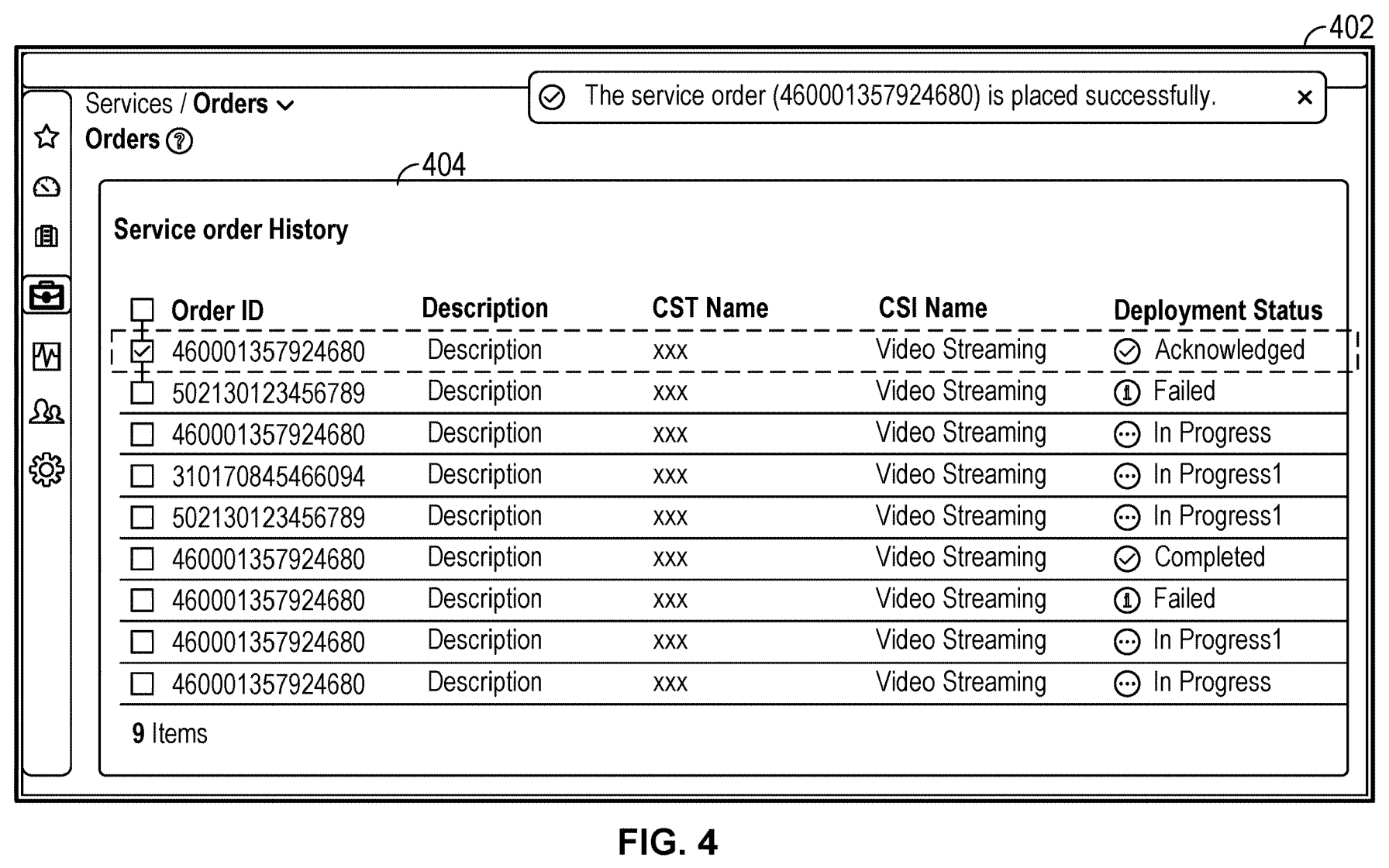

402

Services / Orders

Orders

The service order (460001357924680) is placed successfully.

404

Service order History

| Order ID | Description | CST Name | CSI Name | Deployment Status |
|---|---|---|---|---|
| 460001357924680 | Description | xxx | Video Streaming | Acknowledged |
| 502130123456789 | Description | xxx | Video Streaming | Failed |
| 460001357924680 | Description | xxx | Video Streaming | In Progress |
| 310170845466094 | Description | xxx | Video Streaming | In Progress1 |
| 502130123456789 | Description | xxx | Video Streaming | In Progress1 |
| 460001357924680 | Description | xxx | Video Streaming | Completed |
| 460001357924680 | Description | xxx | Video Streaming | Failed |
| 460001357924680 | Description | xxx | Video Streaming | In Progress1 |
| 460001357924680 | Description | xxx | Video Streaming | In Progress |

9 Items

FIG. 4

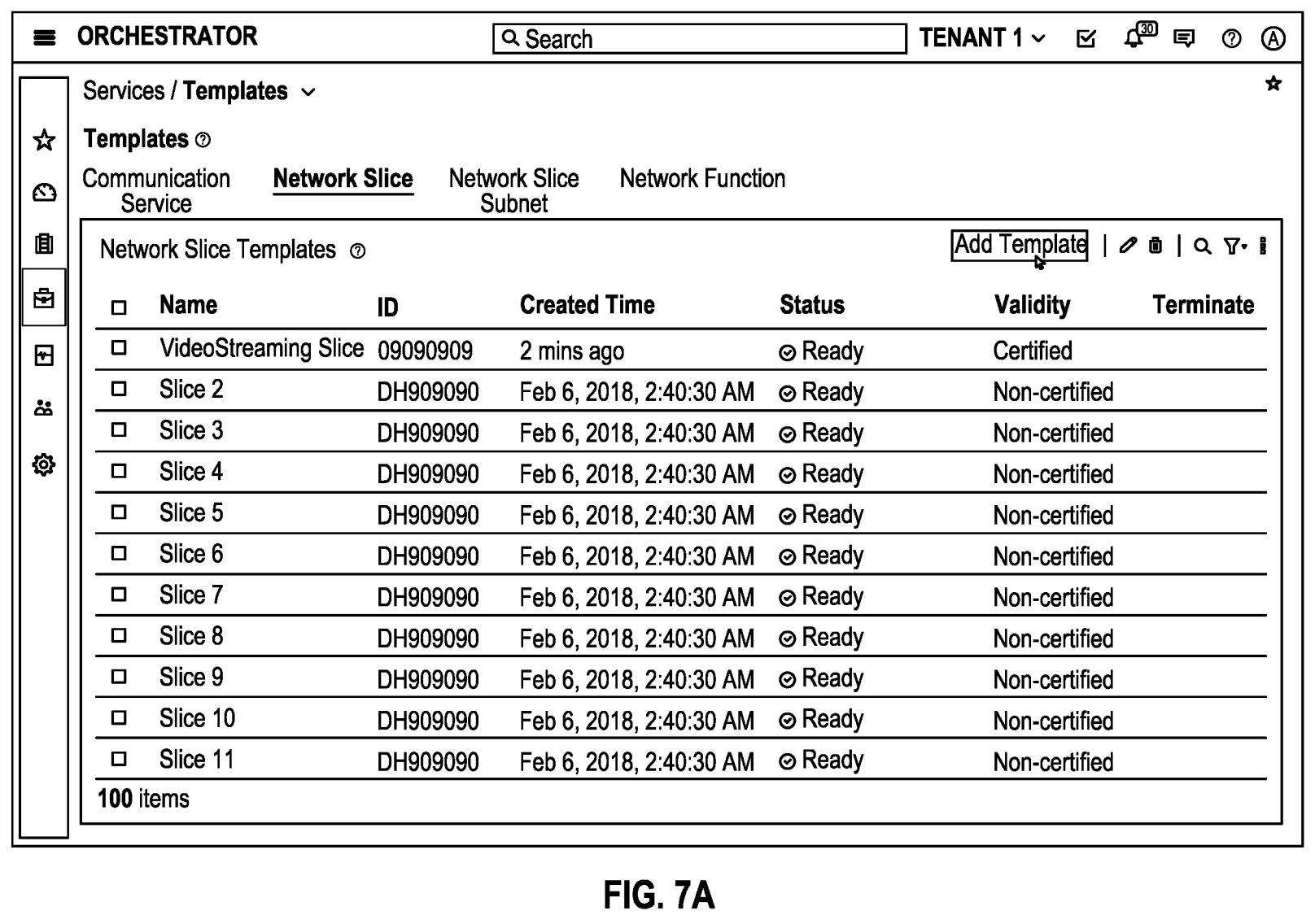

ORCHESTRATOR Search TENANT 1

Services / Templates

Templates

Communication Service | Network Slice | Network Slice Subnet | Network Function Network Slice Templates Add Template

| Name | ID | Created Time | Status | Validity | Terminate |
|---|---|---|---|---|---|
| VideoStreaming Slice | 09090909 | 2 mins ago | Ready | Certified | |
| Slice 2 | DH909090 | Feb 6, 2018, 2:40:30 AM | Ready | Non-certified | |
| Slice 3 | DH909090 | Feb 6, 2018, 2:40:30 AM | Ready | Non-certified | |
| Slice 4 | DH909090 | Feb 6, 2018, 2:40:30 AM | Ready | Non-certified | |
| Slice 5 | DH909090 | Feb 6, 2018, 2:40:30 AM | Ready | Non-certified | |
| Slice 6 | DH909090 | Feb 6, 2018, 2:40:30 AM | Ready | Non-certified | |
| Slice 7 | DH909090 | Feb 6, 2018, 2:40:30 AM | Ready | Non-certified | |
| Slice 8 | DH909090 | Feb 6, 2018, 2:40:30 AM | Ready | Non-certified | |
| Slice 9 | DH909090 | Feb 6, 2018, 2:40:30 AM | Ready | Non-certified | |
| Slice 10 | DH909090 | Feb 6, 2018, 2:40:30 AM | Ready | Non-certified | |
| Slice 11 | DH909090 | Feb 6, 2018, 2:40:30 AM | Ready | Non-certified | |

100 items

FIG. 7A

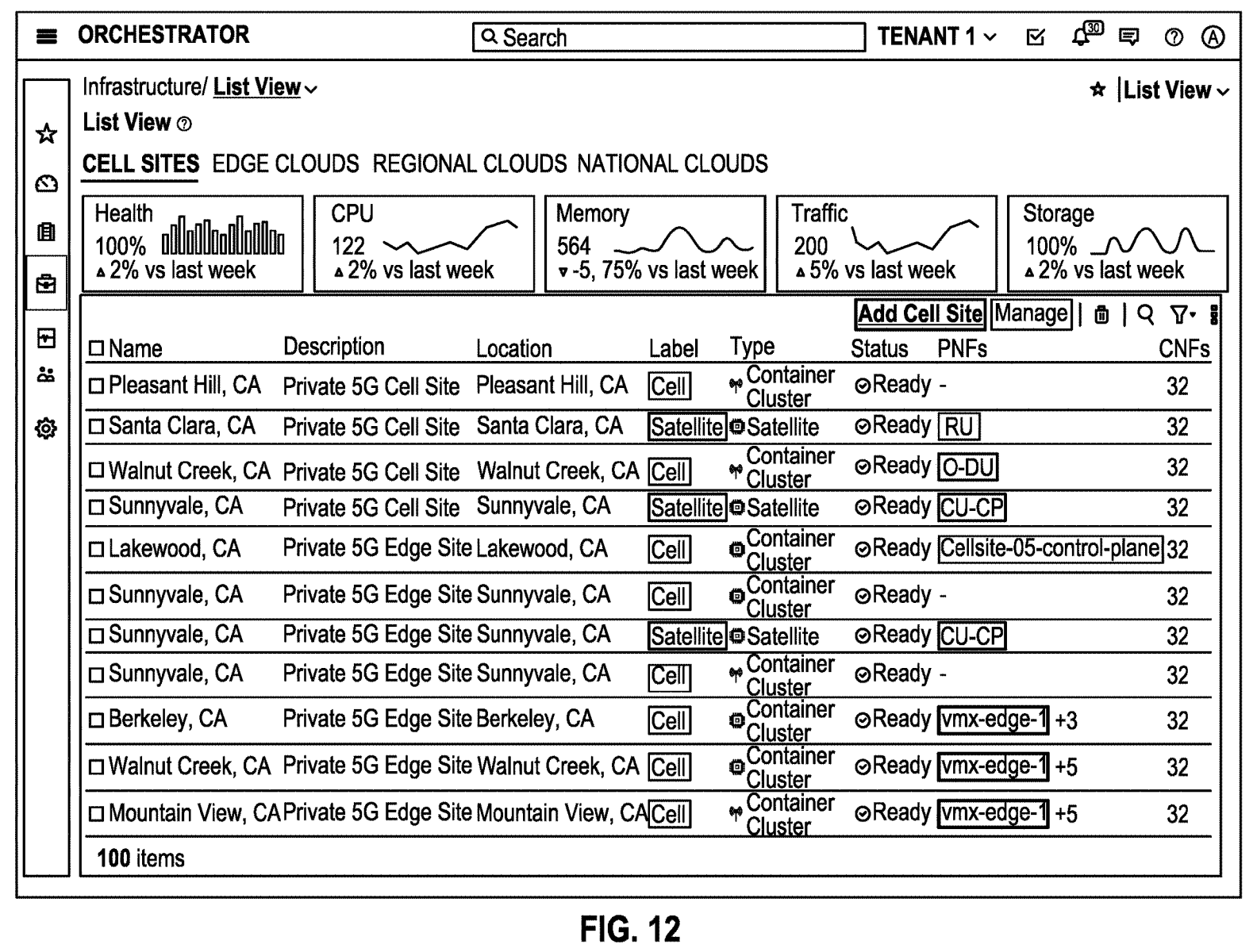

ORCHESTRATOR Search TENANT 1

Infrastructure/ List View

List View

List View

CELL SITES EDGE CLOUDS REGIONAL CLOUDS NATIONAL CLOUDS

Health 100% ▲2% vs last week

CPU 122 ▲2% vs last week

Memory 564 ▼-5, 75% vs last week

Traffic 200 ▲5% vs last week

Storage 100% ▲2% vs last week

Add Cell Site Manage

| Name | Description | Location | Label | Type | Status | PNFs | CNFs |
|---|---|---|---|---|---|---|---|
| Pleasant Hill, CA | Private 5G Cell Site | Pleasant Hill, CA | Cell | Container Cluster | Ready | - | 32 |
| Santa Clara, CA | Private 5G Cell Site | Santa Clara, CA | Satellite | Satellite | Ready | RU | 32 |
| Walnut Creek, CA | Private 5G Cell Site | Walnut Creek, CA | Cell | Container Cluster | Ready | O-DU | 32 |
| Sunnyvale, CA | Private 5G Cell Site | Sunnyvale, CA | Satellite | Satellite | Ready | CU-CP | 32 |
| Lakewood, CA | Private 5G Edge Site | Lakewood, CA | Cell | Container Cluster | Ready | Cellsite-05-control-plane | 32 |
| Sunnyvale, CA | Private 5G Edge Site | Sunnyvale, CA | Cell | Container Cluster | Ready | - | 32 |
| Sunnyvale, CA | Private 5G Edge Site | Sunnyvale, CA | Satellite | Satellite | Ready | CU-CP | 32 |
| Sunnyvale, CA | Private 5G Edge Site | Sunnyvale, CA | Cell | Container Cluster | Ready | - | 32 |
| Berkeley, CA | Private 5G Edge Site | Berkeley, CA | Cell | Container Cluster | Ready | vmx-edge-1 +3 | 32 |
| Walnut Creek, CA | Private 5G Edge Site | Walnut Creek, CA | Cell | Container Cluster | Ready | vmx-edge-1 +5 | 32 |
| Mountain View, CA | Private 5G Edge Site | Mountain View, CA | Cell | Container Cluster | Ready | vmx-edge-1 +5 | 32 |

100 items

FIG. 12

SERVICE MANAGEMENT AND ORCHESTRATION (SMO) OF SATELLITE ACCESS NETWORKS WITHIN A NETWORK SLICE

This application claims priority to Greece Patent Application No. 20230100465, filed 12 Jun. 2023, the entire content of which is incorporated herein by reference.

TECHNICAL FIELD

The disclosure relates to computer networking, and more specifically, to ordering and provisioning communication services in a network.

BACKGROUND

Computer networks have become ubiquitous, and the number of network applications, network-connected devices, and types of network-connected devices are rapidly expanding. Such devices now include computers, smart phones, Internet-of-Things (IoT) devices, vehicles, medical devices factory equipment, etc. 5G network architectures enhanced the ability to provide communication services using network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for a network provisioning system that enables the on-demand provisioning of a network slice including components of a satellite access network (SAN) (and optionally, components of a terrestrial access network (TAN)) for deployment within a communication network, for example, a 5G network. Using the techniques disclosed herein, the network provisioning system as described herein may provide a user interface that enables a network operator to design one or more network slice subnet templates (NSSTs) that include components of the SAN (and optionally the TAN) and to design one or more network slice templates (NSTs) based on the one or more NSSTs. Further, the network provisioning system as described herein may provide a user interface that enables the network operator to deploy, in accordance with the one or more NSTs, a network slice including the SAN (and optionally, the TAN), as well as to manage, modify, and perform maintenance operations of the network slice.

The techniques of the disclosure may provide specific improvements to the computer-related field of computer networking that have practical applications. For example, the techniques disclosed herein may enable a network provisioning system to provide a provisioning portal that provides a user interface facilitating creation of service orders by tenants and other clients of a network operator. The user interface can lead a user through a series of operations of a workflow that can result in the creation of a service order that can instruct a provisioning system to configure and deploy a network service for the user. In some aspects, the communication service can be localized to a particular geographic area by providing an interface for a user to select components involved in providing the communication service from a map. In some aspects, the communication service can include satellite and/or terrestrial network resources. The techniques disclosed herein can provide a technical advantage over previous systems by enabling end-users to perform on-demand provisioning of communication services that include one or more SANs. As a practical application of the techniques described in this disclosure, a provisioning portal can be used by an end-user tenant of a network operator to provision communication services of the network operator for use by the tenant. The provisioning portal can facilitate an end-user ordering a network service and have the network service provisioned on-demand without involving mobile network operator personnel. As a result, a tenant may be able to receive the benefits of the communication server sooner when compared with existing systems. Further, there may be less overhead for a mobile network operator. Moreover, the techniques allow a user to deploy a network slice that includes satellite and/or terrestrial nodes. For example, in implementations that optionally include a TAN in addition to the SAN, the network provisioning system as described herein may enable the seamless integration and abstraction of the various components of the SAN and TAN, thereby reducing the burden to the network operator of management of a network slice which includes a SAN (and optionally, the TAN) without regard to the specific protocols used and capabilities of the individual components of the SAN, TAN, and/or other components of the slice (such as the components of a transport or core network).

In one example, this disclosure describes a system comprising a memory and processing circuitry in communication with the memory and configured to obtain one or more network slice subnet templates (NSSTs), the one or more NSSTs including a satellite access network (SAN) template for a SAN; define, based on the one or more NSSTs, a network slice template (NST) for a network slice; and deploy, in accordance with the NST, a network slice comprising the SAN.

In another example, this disclosure describes a method comprising obtaining, by a computing system, one or more network slice subnet templates (NSSTs), the one or more NSSTs including a satellite access network (SAN) template for a SAN; defining, by the computing system and based on the one or more NSSTs, a network slice template (NST) for a network slice; and deploying, by the computing system and in accordance with the NST, a network slice comprising the SAN.

In another example, this disclosure describes non-transitory computer readable storage medium comprising instructions that, when executed, are configured to cause processing circuitry of a computing system to obtain one or more network slice subnet templates (NSSTs), the one or more NSSTs including a satellite access network (SAN) template for a SAN; define, based on the one or more NSSTs, a network slice template (NST) for a network slice; and deploy, in accordance with the NST, a network slice comprising the SAN.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual view of a user interface screen showing service order status, according to techniques of the disclosure.

FIGS. 7A-7G are conceptual views of a user interface screen for provisioning a network service, according to techniques of the disclosure.

FIG. 12 is a conceptual view of a user interface screen for provisioning a network service, according to techniques of the disclosure.

DETAILED DESCRIPTION

Figure 1:
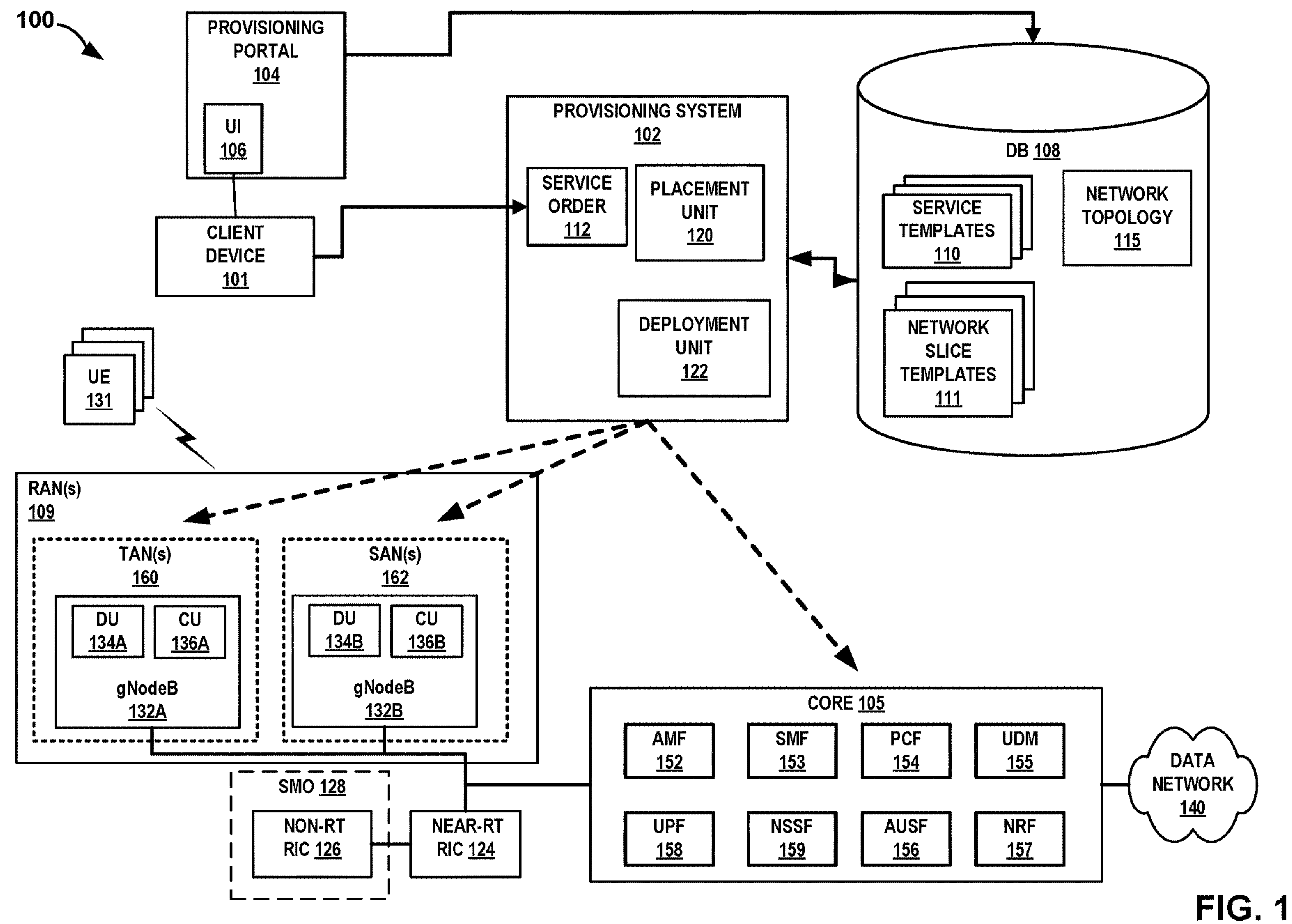
FIG. 1 is a block diagram illustrating an example network system, according to techniques of the disclosure.

A network provisioning system may provide a portal to a user to perform service management and orchestration (SMO) operations for a communication network, such as a 5G network. Such a portal may present visual cues via a user interface that provides visualizations of the service provisioning process and receives user input that, in some cases, can be selected from the visualizations. In some aspects, the user can be a tenant (e.g., a customer) of a 5G mobile network operator, or the network operator itself. As an example, the tenant may be an enterprise customer of the mobile network operator. In some aspects, the user can be an administrator of a 5G network service provider. In some aspects, the user can provision network resources that 5G includes satellites that provide 5G network connectivity.

Provisioning a service in a 5G network domain can involve multiple services and multiple service providers. For example, provisioning an end-to-end 5G network slice may involve provisioning network functions to support a network slice in multiple geographically-distributed data centers ("multi-cloud") and may further involve services provided and implemented in multiple network domains ("multi-domain") such as a RAN, TAN, SAN, transport networks, core network services, and service gateway interfaces (SGi). The different services and network domains may have different capabilities, functions, and service levels. Further, the provisioning of base stations provided satellites of a SAN may increase the complexity of designing, deploying, and maintaining a network slice due to the unique complexities of space-based network resources. For example, a base station provided by an individual satellite may not be capable of providing continuous network connectivity to a fixed location due to the satellite possessing an orbit that is not geostationary. In addition, satellites may utilize different connectivity procedures that are different than or incompatible to those used by base stations provided by a TAN. The particulars of deploying network slices that include base stations provided by satellites may make it substantially more challenging to seamlessly integrate the deployment of network slices that incorporate satellite resources, or network slices that include both satellite and terrestrial resources.

According to the techniques disclosed herein, a network provisioning system as described herein may enable a tenant (or network service provider for a provider-owned slice) to initiate, on-demand, provisioning of a communication service that includes satellite and terrestrial resources with a pre-defined service level agreement (SLA) and network slice templates (NSTs), and enable the tenant to specify different attributes of the service, e.g., tracking areas, compute clouds/data centers, allowed subscribers, network slice selection policies, etc. The communication service can be ordered by an end-user via a user interface that provides for profile selection and visual cues for selecting tracking areas, subscribers, data centers, etc. The techniques disclosed herein can facilitate a service order creation process that can be used by an end-user to request on-demand provisioning of an end-to-end network that can be created for specific SLA, use cases, and user requirements. In some aspects, the end-user can be a tenant of a mobile network operator that can provision communication services on an on-demand basis.

A network service provider such as a mobile network operator can utilize the techniques described herein to provide networking as a service (NaaS) to their customers. For example, the techniques can facilitate end-user and on-demand provisioning of private mobile networks. Examples of such private mobile networks include dedicated networks for connected vehicles, Internet-of-Things (IoT) networks, networks for industries etc. In some aspects, the network service provider may create, on demand, a network slice having QoS and other parameters based on a service order generated by a tenant or other end-user via an interface implementing techniques described herein.

FIG. 1 is a block diagram illustrating example network system 100, according to techniques of the disclosure. In the example illustrated in FIG. 1, network system 100 includes provisioning system 102, provisioning portal 104, one or more RANs 109, and core 105. As examples, RAN 109 may be formed from one or more SANs 162 and, optionally, one or more TANs 160. Provisioning system 104 provisions communication services for customer of a network operator, for example, a mobile network operator. As an example, a tenant may order a communication service from a mobile network operator. The desired service may be described in service order 112. Provisioning system 102 processes the service order and may assign communications infrastructure and resources needed to provide the desired service to the tenant based on information in service order 112.

In some aspects, resources associated with the service to the tenant may be provided by, or managed by, functions of core 105 and/or components of RAN 109. In some aspects, core 105 implements various discrete control plane and user plane functions for network system 100. In some aspects, core 105 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 may provide access mobility management services. SMF 153 may provide session management services. PCF 154 may provide policy control services. Unified Data Management (UDM) function 155 may manage network user data. AUSF 156 may provide authentication services. Network Repository Function (NRF) 157 may provide a repository that can be used to register and discover services in a network operator's network. Network Slice Selection Function (NSSF) 159 may be used to select an instance of an available network slice for use by a user equipment (UE) device 131. Core 105 may also include User Plane Functions (UPF) 158. UPF 158 may provide packet routing, forwarding and other network data processing functions (e.g., Quality of Service, packet inspection, traffic optimization etc.). Further details on services and functions provided by AMF 152, SMF 153, PCF 154, UDM 155, NRF 157, AUSF 156 NRF 157, UPF 158 and NSSF 159 can be found in 3$^{rd}$ Generation Partnership Project 2021, *Technical Specification Group Services and System Aspects; System architecture for the 5G System* (*5GS*); *Stage* 2 (*Release* 17), TS 23.501 V17.0.0 (2021-03), the entire contents of which is hereby incorporated by reference.

In some examples, RANs 109 include radio units (RUs) located at various cellular network sites ("cell sites"), along with distributed units (DUs) and centralized units (CUs). Each RU consists of an LO PHY and a RF transmitter. The LO PHY component may be implemented using specialized hardware for high-performance packet processing.

RUs can connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the Radio Link Control (RLC), Media Access Control (MAC), and the HI PHY layer. DUs are at least partially controlled by CUs.

DUs can connect to CUs via a midhaul network, which may be used by DUs and CUs to implement the F1 interface of 5G. CUs may implement the Radio Resource Control (RRC) and Packet Data Convergence Protocol (PDCP) layers. CUs connect to core 105 via a backhaul network. The midhaul and backhaul networks may each be wide area networks (WANs).

RANs 109 may include a gNodeB 102. In some examples of RANs 109 of network system 100, gNodeB 102 includes a CU 136 and a DU 134. CU 136 may support multiple DUs to implement multiple gNodeBs. Further, one or more RUs may be supported by a single DU 134.

Any DU may or may not be located at the cell site that includes the RU(s) supported by the DU. A DU may be located at a cell site, while other DUs may be located at a local data center and collectively support multiple RUs. Network system 100 may have RANs 109 that include many thousands of cell sites and gNodeBs across multiple TANs 160 and SANs 162.

RANs 109 connect to core 105 to exchange packets with data network 140. Core 105 may be a 5G core network, and data network (DN) 140 may represent, for example, one or more service provider networks and services, the Internet, 3rd party services, one or more IP-VPNs, an IP-multimedia subsystem, a combination thereof, or other network or combination of networks.

TANs 160 may optionally form at least a part of RANs 109. TANs 160 may include one or more land-based networks. Provisioning system 102 may deploy one or more network slices across one or more TANs 160.

In accordance with the techniques of the disclosure, one or more SANs 162 optionally form at least a part of RANs 109. SANs 162 may include one or more networks associated with space-based networking components such as satellites providing 5G network access. SANs 162 may include a single satellite operating at a particular orbit, or may include multiple satellites at one or more orbits. SANs 162 may include one or more satellite constellations operating at one or more orbits such as low Earth orbit (LEO) or geostationary orbit. For example, SANs 162 may include several LEO satellites providing 5G network access to subscribers. Provisioning system 102 may deploy one or more network slices on SANs 162. One or more satellites within SANs 162 may form an access network by providing access service functionality such as implementations of DU 134 and CU 136 of gNodeB 132. SANs 162 may be implemented in accordance with one or more standards set forth in 3rd Generation Partnership Project, Technical Specification Group Services and System Aspects; Service requirements for the 5G system; Stage 1 (Release 19), 3GPP TS 22.261 v19.2.0, dated Mar. 31, 2023, available at https://portal.3gpp.org/desktopmodules/Specifications/SpecificationDetails.aspx?specificationId=3107, the entire contents of which is hereby incorporated by reference.

Provisioning portal 104 provides an interface for use by client device 101 to provision communication services. In some aspects, provisional portal 104 can present a user interface 106 that presents user interface elements (e.g., screens, menus, maps, etc.) as part of a workflow for provisioning a communication service. In some aspects, the user interface and workflow can be an "end-to-end" workflow such that when the workflow is completed, there is enough information available to provisioning portal 104 to create service order 112 that can be used by provisioning system 102 for provisioning a desired communication service, such as a network slice.

Client device 101 can be an end-user computing device that receives user interface 106 elements for presentation, via a display coupled to client device 101, to a user operating client device 101. In some aspects, client device 101 may be operated by a tenant of a mobile network operator and used to order a desired communication service. In some aspects, client device 101 may be operated by mobile network operator personnel and used to provision communication services for tenants or for the use of the mobile network operator. For example, a mobile network operator may use the provisioning portal to provision slices to carry voice traffic, web browsing traffic, or other types of traffic.

Provisioning portal 104 can be communicatively coupled to client device 101 and provisioning system 102. In the example illustrated in FIG. 1, provisioning portal 104 is executed in a computing environment, which may be provided by a cloud service provider or at a branch office of the MNO. However, provisioning portal 104 may be executed in other environments. Provisioning portal 104 may be a component of provisioning system 102. Further, provisioning portal 104 may be a component of a server or other computing device in a data center, such as a data center of a mobile network operator. In addition, some operations attributed herein to provisioning system 102 or provisioning portal 104 may in various example be performed by either provisioning system 102 or provisioning portal 104.

Provisioning portal 104 may logically organize networks and components by whether the components are land-based or space-based. For example, provisioning portal 104 may organize one or more RANs 109 (or various access networks forming RANs 109) into TANs and SANs, such as TANs 160 and SANs 162.

In some aspects, communication services that may be provisioned using provisioning portal 104 include network slices. In 5G network environments, network slicing is a network architecture that facilitates creations of multiple virtualized and independent logical networks that are multiplexed over the same physical network infrastructure. A network slice can be logically isolated from other network slices and can be customized to meet service level expectations of an application that may be established by a service level agreement (SLA). In the example illustrated in FIG. 1, provisioning system 102 can create and allocate network slices on the mobile network operator's access network to data network 140.

In some aspects, mobile network operator may create network slice templates 111. A network slice template 111 can be a blueprint that defines various network slice attributes used to configure a network slice. For example, a network slice template can define networks and services used by a slice and interfaces to such networks and services. The template may be used to create a slice that may be tailored for a particular purpose. For example, network slice templates 111 may include a template for creating a network slice to carry video streams, a template for creating a network slice to carry cloud gaming network traffic, a template for creating a network slice to carry artificial reality traffic, etc.

In some aspects, a mobile network operator may create a network slice that includes one or more of TANs 160 and SANs 162. For example, a mobile network operator may create a network slice that includes one or more SANs 162 and optionally, one or more TANs 160. As an example, a mobile network operator may create a network slice that includes two of TANs 160 and a single of SANs 162.

A network provisioning system, such as provisioning system 102, provides a user interface such as UI 106 that enables a network operator to design one or more NSSTs that include components of the SAN such as one or more of SANs 162 (and optionally a TAN such as one or more of TANs 160) and to design one or more NSTs such as network slice templates 111 based on the one or more NSSTs. Further, provisioning system 102 may communicate with a provisioning portal, such as provisioning portal 104, and provide UI 106 that enables the network operator to deploy, in accordance with one or more of NSTs 111, a network slice including one or more of SANs 162 (and optionally one or more of TANs 160), as well as to manage, modify, and perform network maintenance operations of the network slice.

In some aspects, provisioning system 104 may obtain one or more NSSTs, the one or more NSSTs including a SAN template for a SAN such as one or more of SANs 162.

Provisioning system 104 may define, based on the one or more NSSTs, an NST for a network slice. Provisioning system 104 may cause provisioning system 102 to deploy, in accordance with the NST, a network slice comprising the SAN. In some aspects, the one or more NSSTs may include the SAN template for the SAN and a template for a core network. Provisioning system 104 may deploy the network slice comprising the SAN and the core network.

In some aspects, UI 106 may receive a selection of one or more tags. Provisioning system 104 may select, from a plurality of base stations of the SAN and based on one or more base stations of the plurality of base stations of the SAN having attributes matching the one or more tags, the one or more base stations and deploy one or more network functions for the network slice on the selected one or more base stations of the SAN.

In some aspects, provisioning portal 104 may display an instance of UI 106 that includes a representation of a map of a service area to which a network slice is deployed. UI 106 may include a representation that includes one or more icons corresponding to one or more base stations of a SAN that are proximate to the service area. In an example, provisioning portal 104 displays UI 106, where UI 106 includes a visual representation of a service area that includes the San Francisco Bay Area to which a network slice has been deployed. UI 106 may be configured by provisioning system 102 to include one or more visual elements such as icons corresponding to one or more base stations of a SAN such as one of SAN(s) 162 that are proximate to the service area.

In some aspects, provisioning system 102 may receive, via UI 106, an indication to add a base station provided by a satellite of a plurality of satellites of one of SAN(s) 162. Provisioning system 102 may additionally receive, via UI 106, an indication to remove the base station provided by the satellite of the plurality of the satellites. Provisioning system 102, responsive to the receipt of an indication to add and/or remove a base station provided by a satellite, may modify a network slice based at least in part on the selection.

In some aspects, UI 106 may receive a selection of one or more performance requirements. Provisioning system 104, may select from a database of a plurality of NSSTs and based on the one or more NSSTs having values matching the one or more performance requirements, the SAN template.

Provisioning portal 102 may enable network operators to manage onboarding and life-cycle management of infrastructure in the inventory of SMO 128. SMO 128 may enable a network operator interacting with provisioning portal 102 to register clouds and clusters in both the terrestrial domain and the satellite domain (e.g., TANs 160 and SANs 162). SMO 128 may enable network operators to register private and public clouds that include SANs 162 and deployments of core 105. Additionally, SMO 128 may enable network operators to deploy space and ground segments of satellites (e.g., SANs 162 and terrestrial core deployments).

Provisioning portal 104 may enable network operators to view and manage satellites in a service provider's inventory. Providing portal 104 may cause UI 106 to display a graphical user interface that displays the satellites in a list view and a topology view that shows the topology of interconnected satellites, space stations, and ground stations. In addition, provisioning portal 104 may cause UI 106 to display a graphical user interface that illustrates a geo-map/globe view that illustrates using graphical elements that represent trajectory and the live location of satellites over a terrestrial map, in addition to the locations of terrestrial stations and clouds on the terrestrial map.

Figure 2:
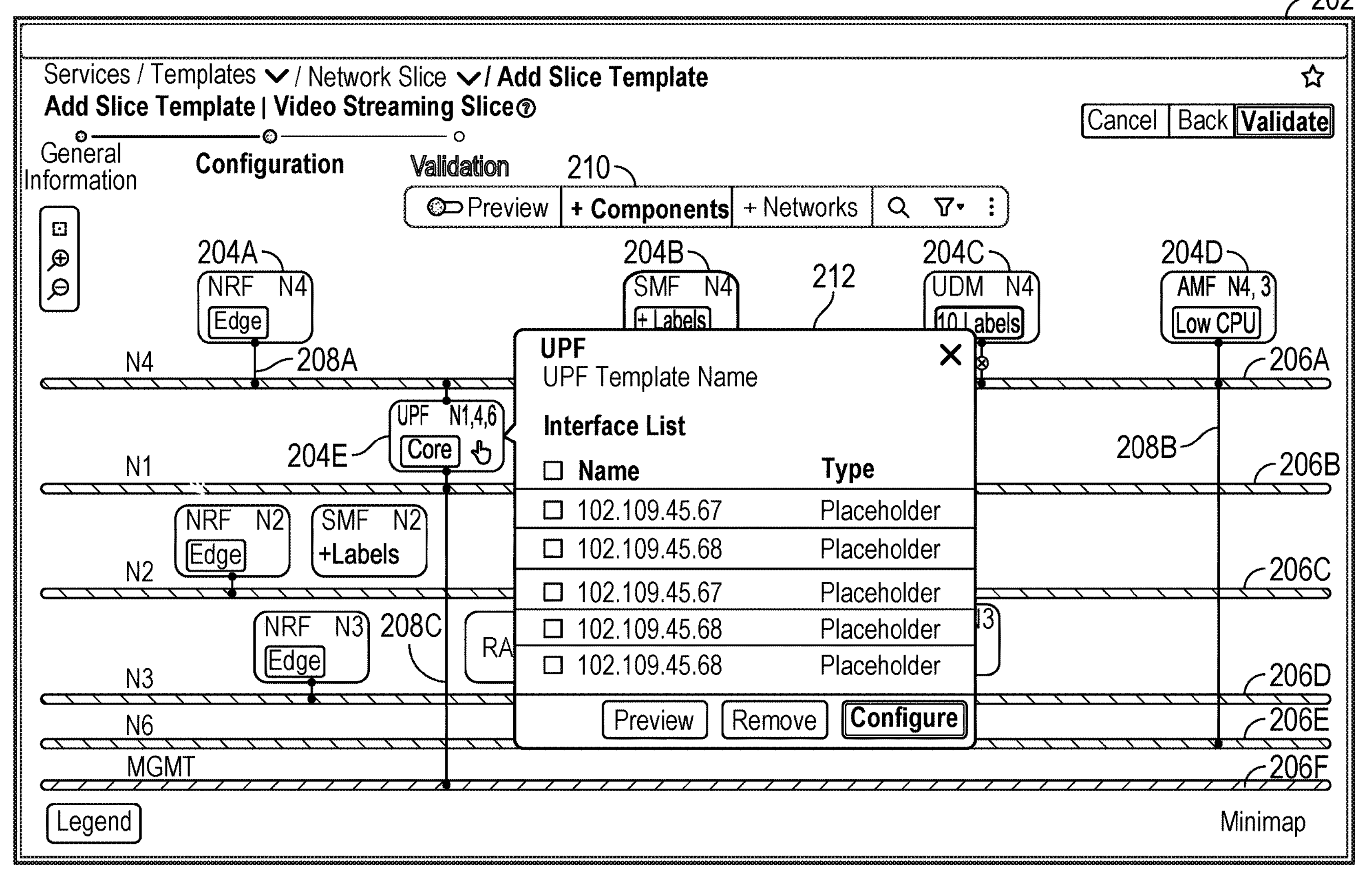
FIG. 2 is a conceptual view of a user interface screen for adding a network slice template, according to techniques of the disclosure.

FIG. 2 is a conceptual view of a user interface screen for adding a network slice template, according to techniques of the disclosure. FIG. 2 will be discussed in conjunction with aspects of FIG. 1. Slice template screen 202 may be used, for example, by a mobile network operator to define network slice templates for use by tenants in ordering and provisioning communication services. In some aspects, slice template screen 202 may be provided by user interface 106 of provisioning portal 104. In the example illustrated in FIG. 2, interface screen 202 includes graphical elements representing components used to implement a network slice, including network functions 204A-204E, interfaces 206A-206F, and connections 208A-208C. In some aspects, a function 204 may be any of functions 152-159 of core 105. Slice template screen 202 can provide a user interface to incorporate network functions 204A-204E and network interfaces 206A-206F into a network slice template. Slice template screen 202 can also be used to create and display connections 208 between interfaces 204 and functions 206. Provisioning portal 104 may obtain available functions, interfaces, and other network infrastructure elements to use when defining a network slice template from network topology 115 of database 108.

A user may utilize slice template screen 202 to add slice components such as functions 204 and interfaces 206 using control 210 to a network slice definition. After functions 204 and interfaces 206 are added to a network slice template, the user may utilize the interface provided in screen 202 to connect functions to interfaces. In the example illustrated in FIG. 2, NRF function 204A has been connected to N4 interface 206A, AMF function 204D has been connected to N4 interface 206A and N3 interface 206D, UPF interface 204E has been connected to N4 interface 206A, N1 interface 206B, and N6 interface 206E. Interface 206F can be a virtual network that connects multiple network functions. In the example shown in FIG. 2, management interface 206F can be a virtual network with management capabilities that connects multiple network functions. The network slice template, once created, can be used as a blueprint to create video streaming slices.

In some aspects, a function 204 may be assigned one or more labels using slice template screen 202. In the example, illustrated in FIG. 2, NRF function 204A has been assigned a label "Edge," AMF function 204D has been assigned a label "Low CPU," and UPF function 204E has been assigned the label "Core." Other functions 204 shown in FIG. 2 have also been assigned labels. During deployment of a slice created using the template, provisioning system 102 may use a label for a function 204 to match functions used by the provisioned slice to network infrastructure such as compute clouds or compute nodes. For example, a function having an "Edge" label may indicate that it is desirable (or even mandatory) that provisioning system 102 assign the function to resources in an edge compute cloud. For instance, it may be desirable that NRF function 204A be available with low latency, thus making it more desirable for provisioning system 102 to locate NRF function 204A at an edge of the network slice infrastructure. In this case, NRF function 204A has been assigned an "Edge" label. As a further example, a "Core" label may indicate that it is desirable that the network function be assigned to resources closer to the core of the 5G network slice. For example, User Plane Function (UPF) 204 carries data between a data network and user equipment and it may be desirable to locate UPF 204 closes to the data network (e.g., closer to the core). Other location-related labels may include "regional" or "national". A "low CPU" label may indicate that the function does not require high performance processing capability and can thus be assigned to resources that utilize lower performance processors. A "SmartNIC" label may indicate the function should be deployed to a compute node having a SmartNIC. Other labels may indicate the type of orchestration system for deployed the labeled function, such as "OpenShift", "OpenStack", or "Kubernetes". If a data center or cloud is not capable of supporting a capability associated with a label, the data center or cloud is not able to host the labeled function and may not be selectable in the portal user interface 106 by the user.

In some aspects, a user may utilize slice template screen 202 to obtain further information from components displayed on screen 202. In the example shown in FIG. 2, a user has selected UPF function 204E and, in response, provisioning portal 104 displays, on screen 202, information box 212 about UPF function 204E, including information related to the in interfaces of UPF function 204E. Information box 212 can include control elements (e.g., buttons, menus etc.) to configure the selected element (UPF function 204E in this example), remove the selected element, or preview the selected element. In some aspects, in response to selection of the preview control element, provisioning portal 104 displays the constituent network functions, configuration, and interfaces of the selected element. If the element currently has no constituent elements, the preview control element may be disabled.

After a user has defined a network slice template, for example, using screen 202, the user may assign a name to the network slice template and save the network slice template in database 108 as one of network slice templates 111 for later use in the on-demand provisioning of service facilitated by network system 100.

Returning to FIG. 1, database 108 may also include service templates 110. A mobile network operator may define (perhaps using user interface 106) service templates 110. Service templates 110 can include various templates that have predefined network service attributes that may be appropriate for various types of communication services. For example, service templates 110 may include templates that have predefined attributes that may be appropriate for network slices that are intended to carry enhanced mobile broadband (eMBB) network traffic, massive machine-type communications (mMTC) traffic, ultra-reliable and low-latency communications (URLLC) network traffic, video stream network traffic, augmented reality/virtual reality network traffic, cloud gaming network traffic, etc. Network service attributes can include labels identifying characteristics of components of a network service, core functions or other functions used to provide the communication service, interfaces used by the communication service, SLAs, throughput rates, latency characteristics, uplink and downlink limits, maximum number of user equipment (UE) devices allowed for the service, priority of the service, maximum sessions supported by the service, etc. A service template can serve as a blueprint for on-demand provisioning of communication services. For example, a tenant of a mobile network operator may select a service template as described below to perform on-demand ordering and provisioning of a communication service having attributes defined by the selected template.

FIGS. 3A-3G are conceptual views of user interface screens for on-demand ordering and provisioning a communication service, according to techniques of the disclosure. The user interface screens of FIGS. 3A-3G will be discussed in conjunction with aspects of FIG. 1. Generally speaking, the user interface screens of FIGS. 3A-3G are part of a workflow that a tenant of a mobile network operator (or the mobile network operator itself) may perform to request on-demand provisioning of a communication service. The user interface screens illustrated in the examples of FIGS. 3A-3G may be provided to client device 101 by user interface 106 for presentation on a display of client device 101.

Figure 3A:
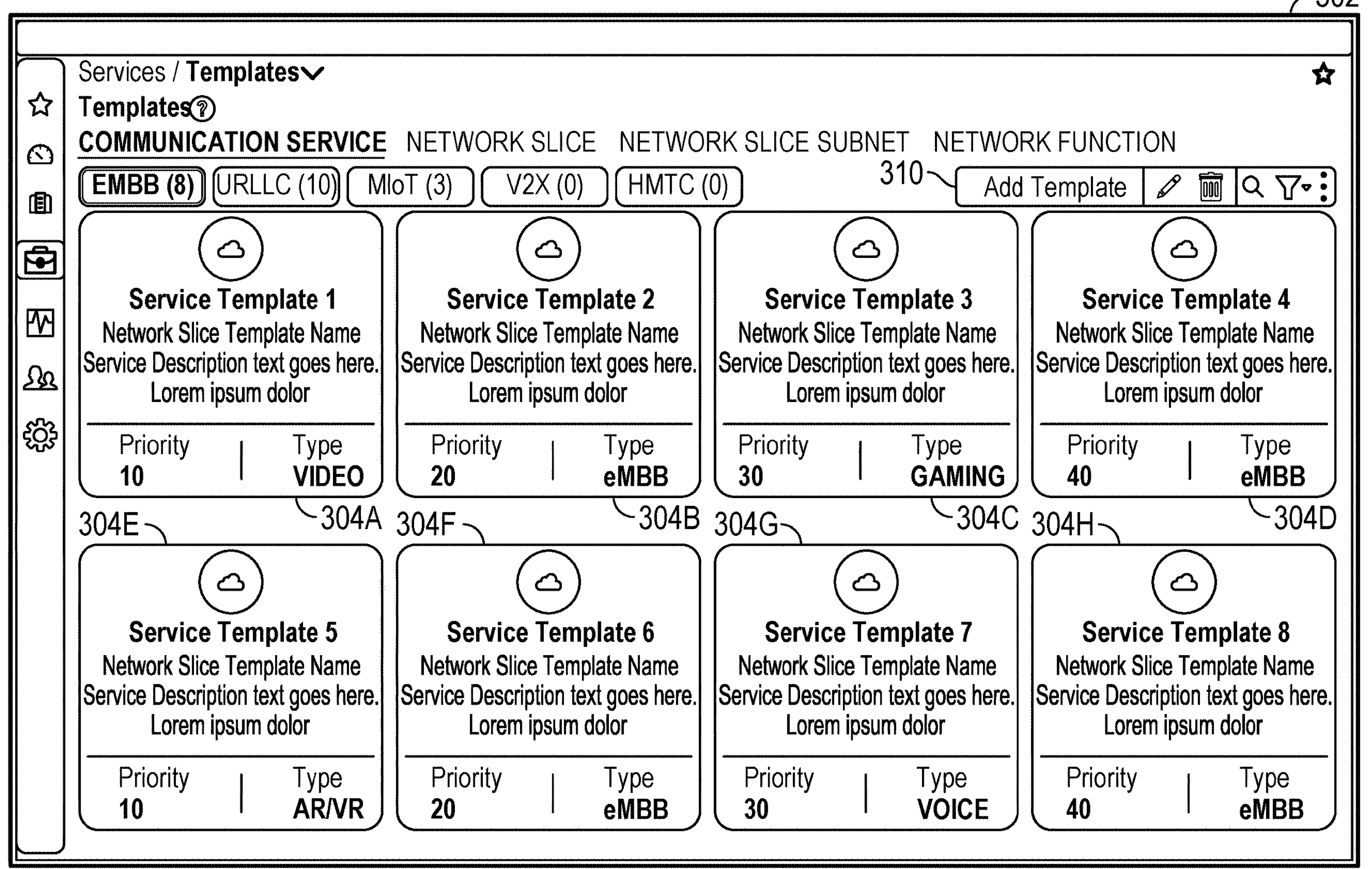
FIGS. 3A-3G are conceptual views of user interface screens for provisioning a network service, according to techniques of the disclosure.

FIG. 3A is a conceptual view illustrating a service template selection screen 302, according to techniques of the disclosure. In some aspects, service template selection screen includes template icons 304A-304H (collectively "template icons 304") that each represent a different service template defined in service templates 110. In some aspects, a template icon can include the name of the template, a description of the template, a network slice template specified by the service template, a priority for network traffic for the provisioned service, and a type of service. A user desiring to provision a new communication service may utilize user interface 106 to select one of template icons 304 that most closely represents the type of communication service the user desires to provision.

Service template selection screen 302 include a control interface element 310 that include user interface elements that, when selected, cause the provisioning portal 104 to perform an action. For example, control interface element 310 includes an "add template" component that, when selected, causes provisioning portal 104 to present a user interface to configure a new service template. Other components of control interface element 310 can cause provisioning portal 104 to apply filters to service templates 304 and/or search for specific service templates 304.

Figure 3B:
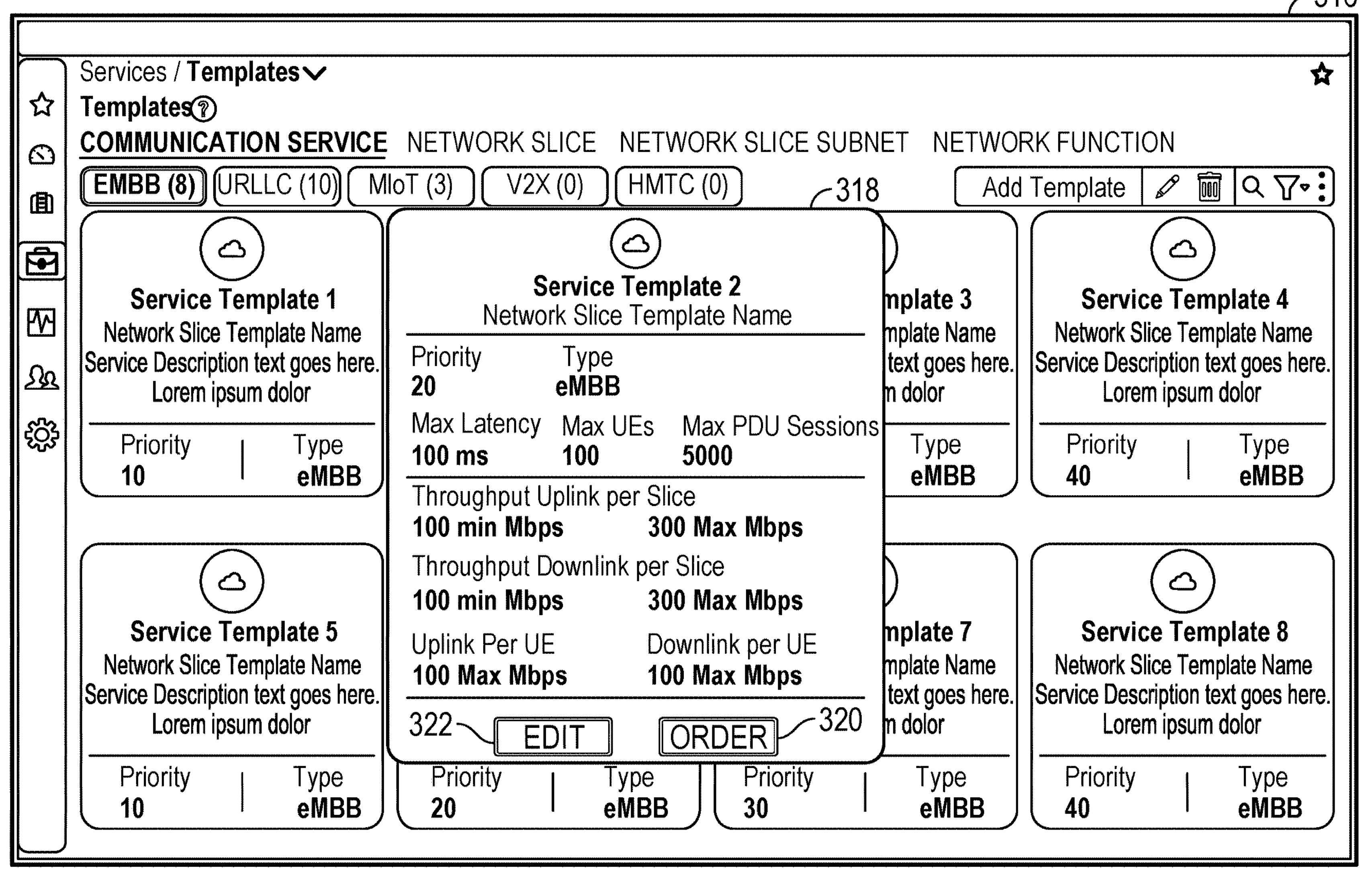

FIG. 3B is a conceptual view illustrating a service template definition screen 318, according to techniques of the disclosure. In the example illustrated in FIG. 3B, service template definition screen 318 is shown in response to selection of template icon 304B of FIG. 3A. Service template definition screen 318 displays attributes of the selected service template. Examples of such attributes include the priority of network traffic carried by a network slice created using the template (e.g., "20"), a type of network traffic carried by the network slice (e.g., "eMBB"). The attributes may also include service level attributes. For example, in the example illustrated in FIG. 3B, the template specifies a maximum latency (e.g., "100 ms), the maximum number of UEs for the communication service (e.g., "100"), and the maximum number of protocol data unit (PDU) sessions for the communication service (e.g., "5000"). Other SLA attributes that may specified include minimum and maximum uplink throughput for the network slice (e.g., "100 Mbps" and "300 Mbps" respectively), a minimum and maximum downlink throughput for the network slice (e.g., "100 Mbps" and "300 Mbps" respectively), and maximum uplink and downlink throughput per UE device (e.g., "100 Mbps" and "100 Mbps" respectively).

Service template definition screen may include an edit user interface element 322 and an order user interface element 320. In response to selection of edit user interface element 322, UI 106 of provisioning portal 104 can present an interface that can be utilized by a user to change various attributes from the default values provided by the selected service template. In response to selection of order user interface element 320, UI 106 of provisioning portal can present further user interface screens that to continue with a service order workflow. In some aspects, provisioning portal 104 may provide an estimated cost to the tenant for a service that is provisioned according to the selected template. For example, a communication service provisioned using a service template that specifies attribute values for a high throughput and/or low latency communication service may be priced higher than a communication service provisioned using a service template that does not specify attribute values for a high throughput and/or low latency communication service.

Figure 3C:
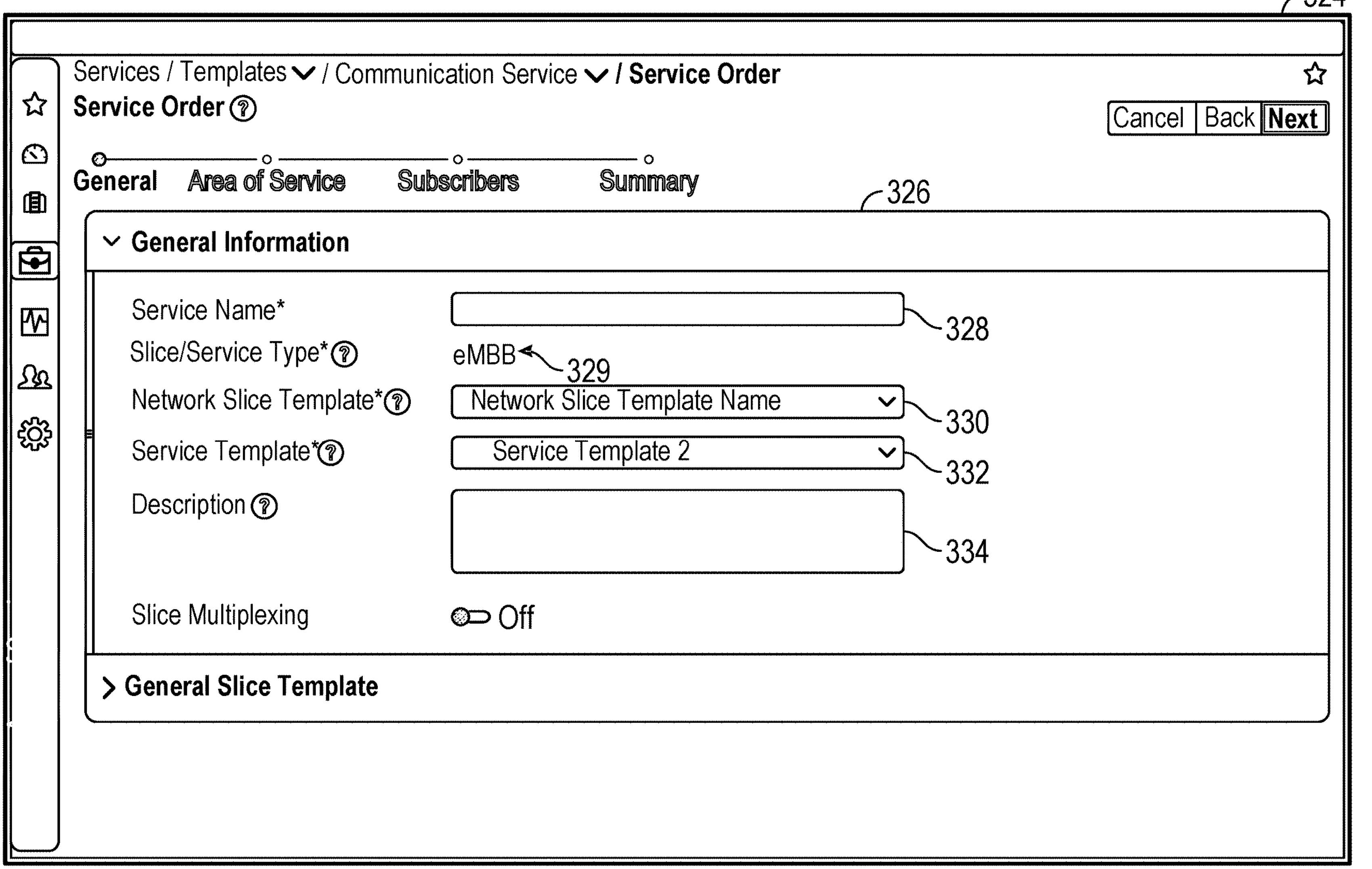

FIG. 3C is a conceptual view illustrating a general information portion 326 for a service order definition screen 324, according to techniques of the disclosure. UI 106 of provisioning portal 104 may present service order definition screen 324 to client device 101 in response to a user of client device 101 selecting the "order" user interface element 320 (FIG. 3B). General information portion 326 includes fields allowing a user to provide a communication service name 328 and a description 334 of the communication service to be provisioned. Additionally, general information portion 326 includes fields that can be used to modify attributes of the communication service from the defaults provided by the service template. For example, general information portion 326 may include service type field 329 that can be utilized to change the service type of the communication service to be provisioned from the default provided by the selected template. Similarly, network slice template field 330 can be used to change the network slice template from the default provided in the service template. Service template field 332 can be used to change the service template for the communication service to be provisioned to a different service template.

Figure 3D:
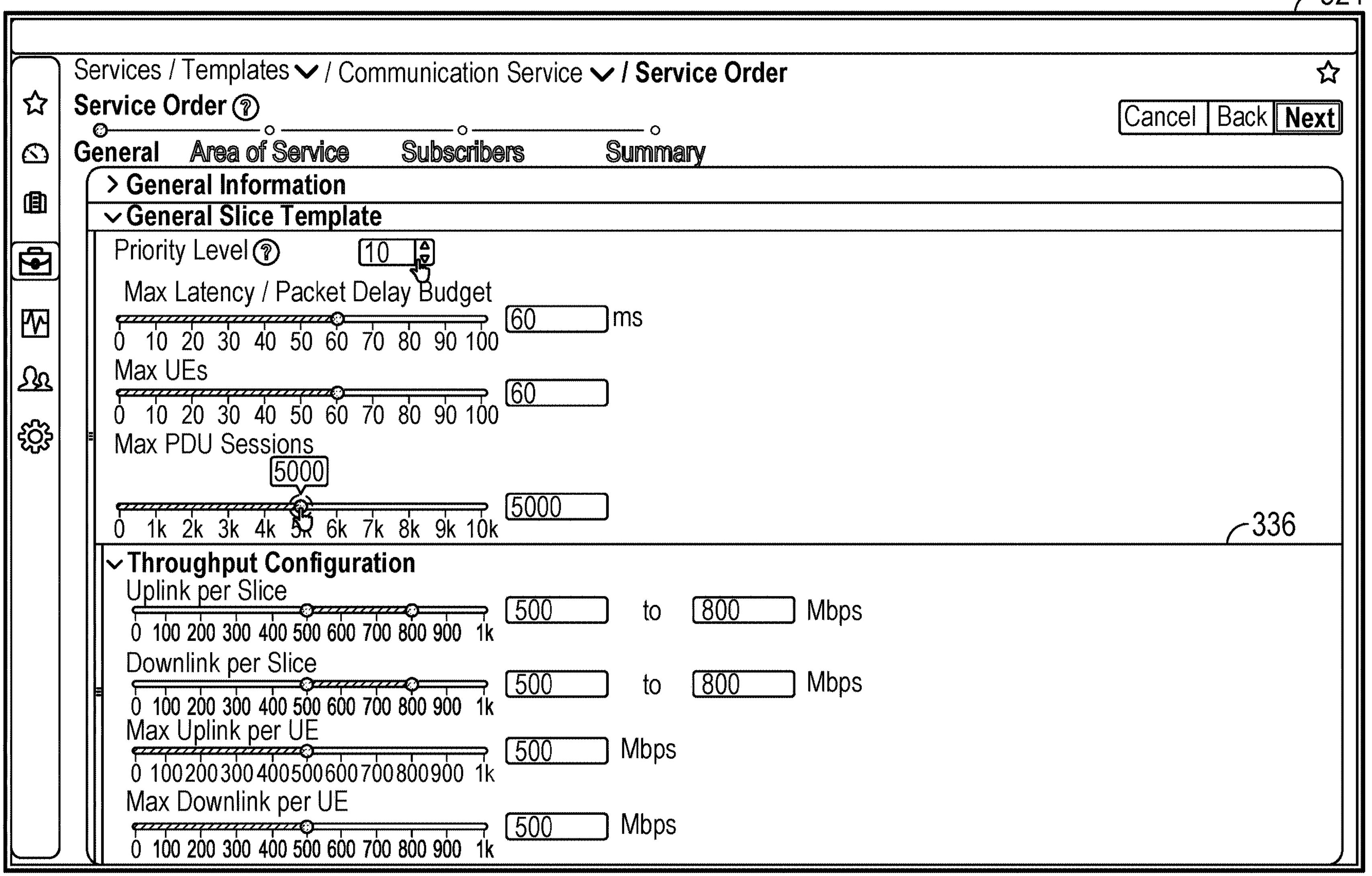

FIG. 3D is a conceptual view illustrating a general slice information portion 336 for a service order definition screen 324, according to techniques of the disclosure. General slice information portion 336 includes fields allowing a user to modify SLA related attributes for the network slice to be provisioned for the communication service. For example, general slice information portion 326 may include user interface elements allowing a user to modify SLA related attributes from the defaults provided by the network slice template associated with the service template. In the example illustrated in FIG. 3D, such attributes include priority, maximum latency, maximum UEs, maximum PDU sessions, minimum and maximum uplink throughput, minimum and maximum downlink throughput, maximum uplink throughput per UE, and maximum downlink throughput per UE. In addition, the SLA requirements may specify requirements for one or more of performance, energy efficiency, network latency, network usage cost, location criteria, and/or network slice placement attributes.

Figure 3E:
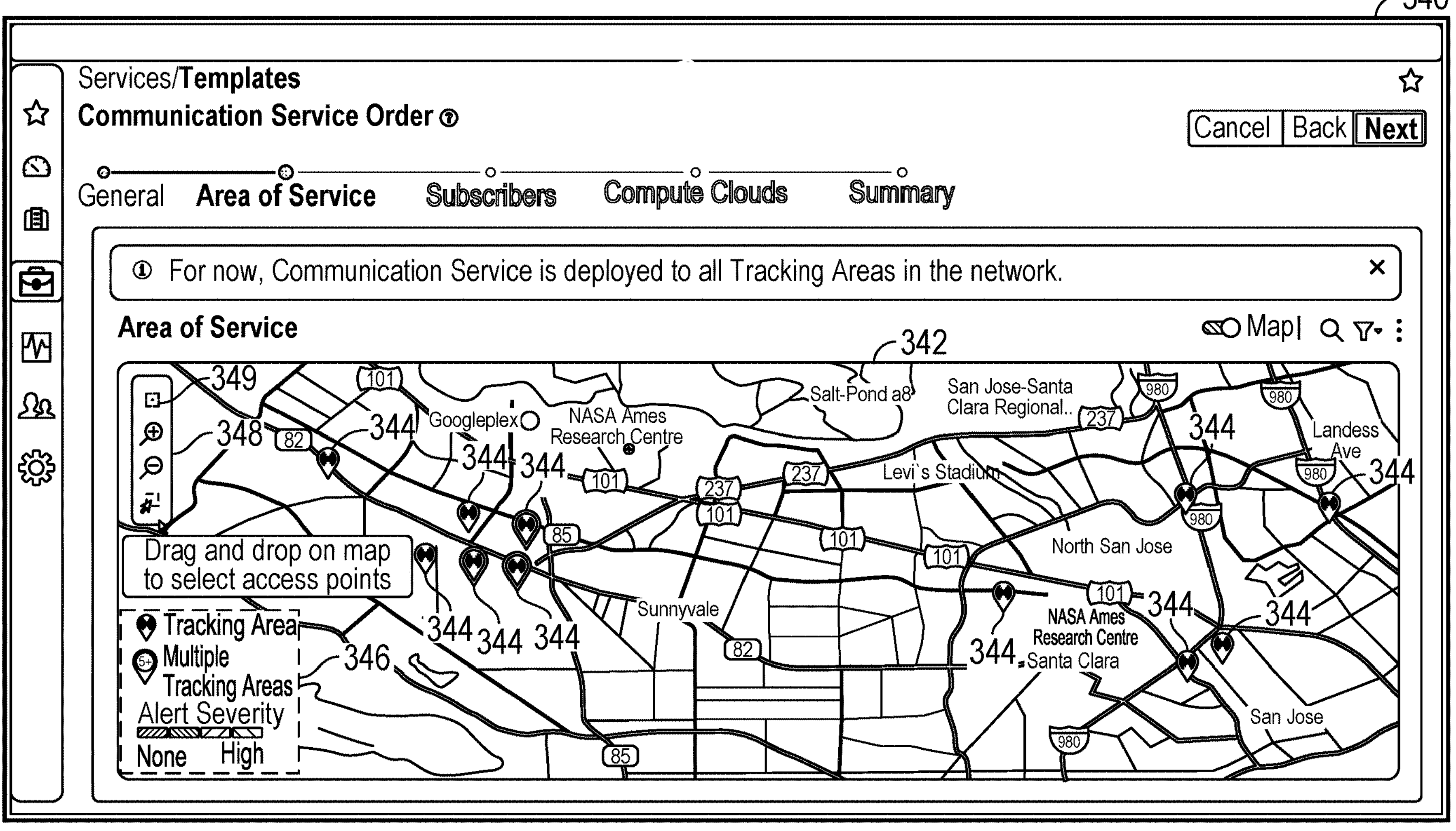

FIG. 3E is a conceptual view illustrating a tracking area selection screen 340 for a service order, according to techniques of the disclosure. Generally speaking, a tracking area is a set of one or more mobile network cells within region that are grouped together to facilitate reducing overhead involved with managing UEs. For example, handshaking protocols can be avoided when A UE moves from one cell in a tracking area to another cell in the same tracking area. A network slice can be associated with multiple tracking areas. Tracking area selection screen 340 of UI 106 provides selection mechanism for associated tracking areas with the network slice to be provisioned as part of a communication service. For example, a tenant may want to localize where a communication service is provided to their subscribers and can do so by selecting the desired tracking areas from selection screen 340. In the example illustrated in FIG. 3E, tracking area selection screen 340 shows a map 342 illustrating tracking areas 344 within a region. A user can utilize tracking area selection screen 340 to select one or more of tracking areas 344 to include in a network slice to be provisioned for the communication service.

Tracking area selection screen 340 includes a legend 346 that explains aspects of the tracking areas 344 shown on tracking area selection screen 340. As an example, legend 346 shows a color coded bar that can indicate an alert condition and severity associated with a tracking area.

Tracking area selection screen 340 also includes control menu 348 having interface elements that can be used to select tracking areas 344 within a region, zoom in or zoom out on the map, etc. In some aspects, a user can utilize region selection tool 349 to select tracking areas of the mobile network operator that are within the region bounded by a rectangle formed using region selection tool 349. As an example, a tenant may desire to provide a specialized communication service in or near a stadium. The tenant can use region selection tool 349 to define the desired region around the stadium on map 342.

Figure 3F:
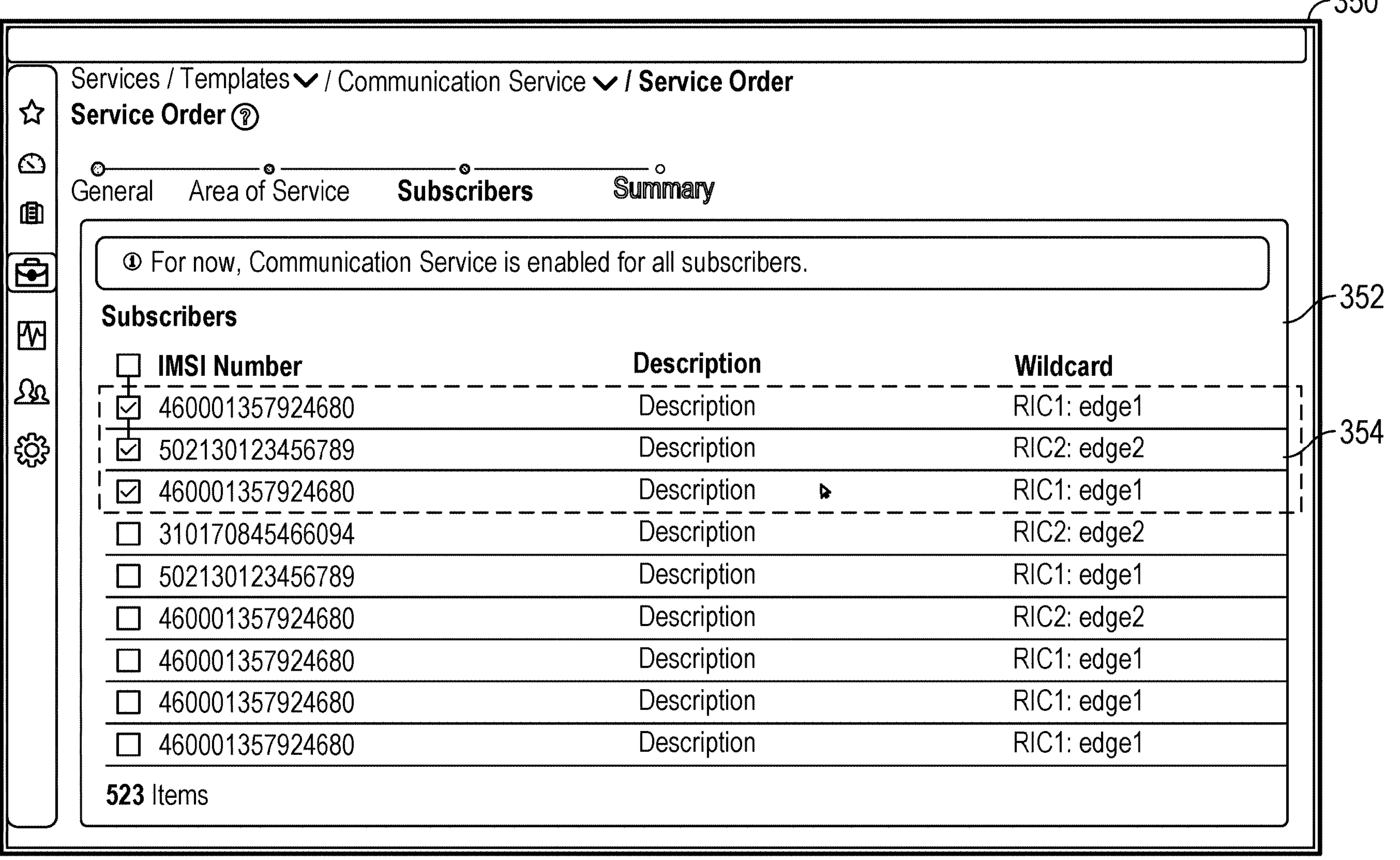

FIG. 3F is a conceptual view illustrating a subscriber screen 350 for a service order, according to techniques of the disclosure. Subscriber screen 350 of UI 106 can present a list 352 of subscribers associated with a tenant that is provisioning a communication service. The tenant can select the subscribers from the list that are to be given access to the communication service being provisioned by the tenant. In the example illustrated in FIG. 3F, a set of subscribers 354 has been selected to be granted access to the communication service once provisioned.

Figure 3G:
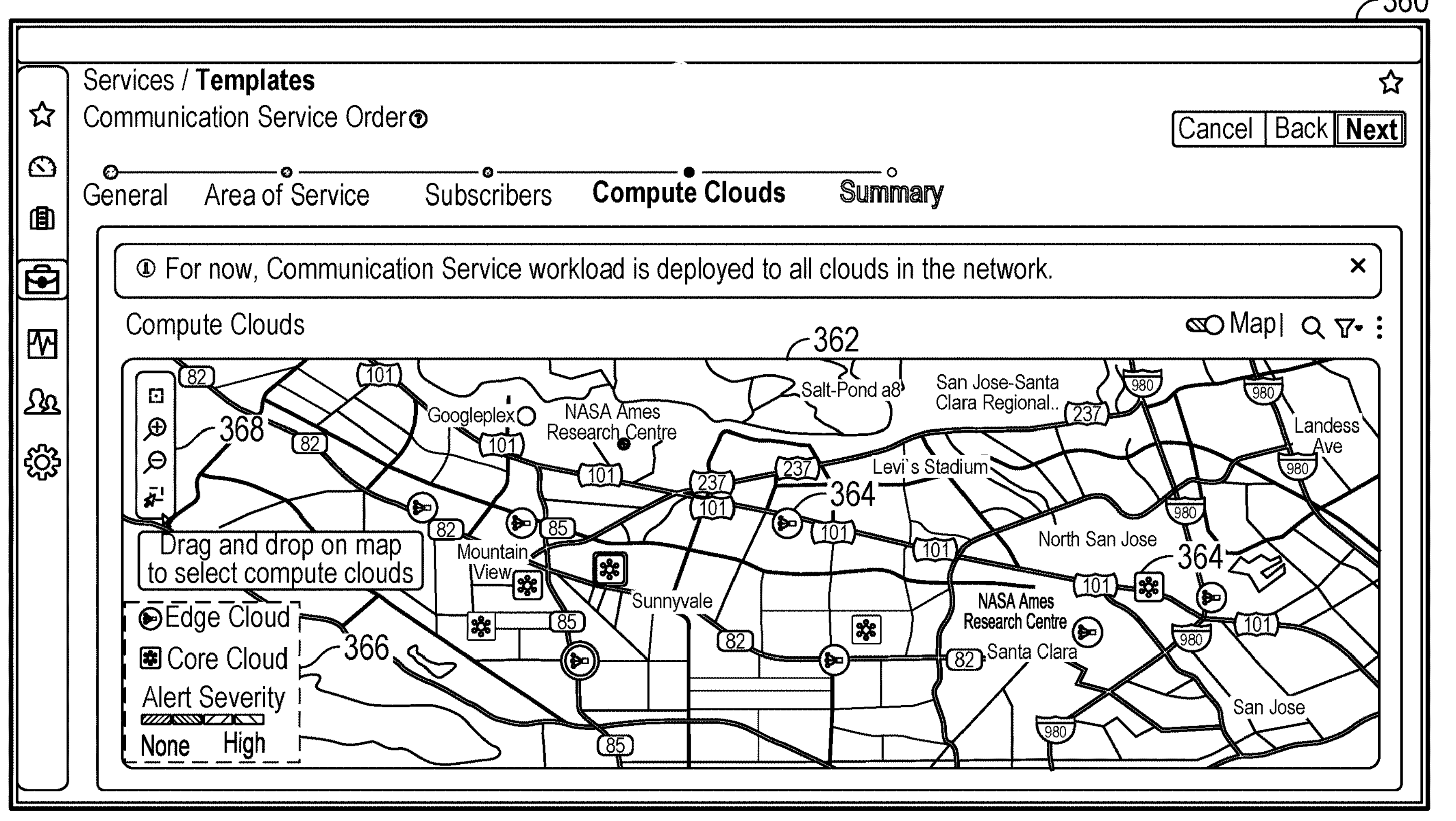

FIG. 3G is a conceptual view illustrating a compute cloud selection screen 360 for a service order, according to techniques of the disclosure. In the example illustrated in FIG. 3G, compute cloud selection screen 360 shows a map 362 illustrating icons 364 that represent compute clouds and/or data centers within a region. In some aspects, the compute clouds and/or data centers displayed on map 362 may be limited to compute clouds and/or data centers that are within the tracking areas previously selected via tracking area selection screen 340 of FIG. 3E. A user can utilize compute cloud selection screen 360 to select one or more of icons 364 representing the compute clouds and/or data centers that are to provide compute resources to execute workloads involved in providing the communication service to be provisioned. For example, workloads may include RAN functions, core 105 functions, etc. A user can select a compute cloud based on desired characteristics of the communication service. For example, the user may select an icon 364 representing an edge cloud if low latency to the end user is desired. Further, a user may select an icon representing a core cloud to cause centralized units (CUs) to positioned near a core cloud, and may select icons representing an edge cloud to cause distributed units (DUs) to be located at an edge cloud. In some aspects, a compute cloud may have a label that indicates characteristics of the compute cloud. For example, the compute cloud may have label indicating the compute cloud is an edge compute cloud, a core compute cloud. Further, labels may indicate the processing power of the compute cloud. Other label may indicate other characteristics of a compute cloud. A mobile network operator can assign such labels to compute clouds. Compute cloud selection screen 360 can include a legend 366 that provides information about the elements on map 362. As an example, legend 346 shows a color coded bar that can indicate an alert condition and severity associated with compute clouds shown on map 362. Compute cloud selection screen 360 also includes control menu 368 that provides user interface elements that can be used to select icons 364 within a region, zoom in or zoom out on the map, etc.

Returning to FIG. 1, in some aspects, the screens shown in FIGS. 3A-3G can be used to complete a workflow that gathers information from a user regarding a communication service to be provisioned on-demand by the mobile network operator that includes one or more SANs 162. The information can be used to create service order 112 that can be processed by provisioning system 102 to provision the desired communication service.

Provisioning system 102 may enable orchestration of end-to-end slice spread across RANs 109 and a core domain such as core 105. Provisioning system may enable the provisioning of a communication service that combines one or more of ground base stations (e.g., TANs 160), edge clouds (including RAN and core network functions), and national and regional clouds (e.g., core network functions). Provisioning system 102 may enable the provisioning of a communication service that includes satellite base stations (e.g., SANs 162 and RAN network functions), satellite edge clouds (e.g., RAN and core network functions), satellite national and regional clouds (e.g., core network functions).

SMO 128 may orchestrate network slices and deploy network functions on a satellite and/or terrestrial network based on one or more criteria. SMO 128 may orchestrate and deploy network functions based on service needs. For example, if a service needs some throughput and does not have strict latency requirements, SMO 128 prefer satellite networks for network slices. In another example, if a service has a requirement for low latency, SMO 128 can prefer terrestrial networks for the network slice.

In some examples, SMO 128 may orchestrate network slices and deploy network functions based on operate defined criteria such as cost of network usage, energy efficiency, and satellite vs 5G networks based on the type of SLA in addition to operator defined criteria. In some examples, SMO 128 may prefer based on location criteria such as preferring a satellite over a terrestrial network for specific regions/tracking areas that do not have base ground stations. In an example, SMO 128 may select a satellite to provide network connectivity in a region with few ground base stations such as the interior regions of Alaska but may select ground base stations to provide network connectivity in an area that has a high density of ground base stations such as Manhattan. In an example SMO 128, may select a satellite to provide network connectivity over a large body of water to one or more vessels.

In some examples, SMO 128 may utilize placement logic in orchestrating and provisioning network functions. In an example, if a slice template contains network functions with placement attributes, then the orchestrator deploys the network functions on the specific location/domain.

Placement unit 120 can provide the information in service order 112 as input to a placement algorithm (also referred to as a homing algorithm) executed by placement unit 120 that can determine placement communication service elements (e.g., CUs and DUs) within the tracking areas and compute clouds selected by the user as described above. In some aspects, placement unit 120 places communication service elements based on labels associated with network slice elements. As an example, the placement algorithm can match attributes of the communication service specified in the service order with labels associated with infrastructure elements in the network slice template and labels of compute clouds. For instance, placement unit 120 may attempt to place a DU for a communication service whose attributed indicates low latency is required in a DU that is at an edge cloud selected by the user. Placement unit 120 may use other characteristics and attributes to determine placement of the network resources used by the communication service. For example, placement unit 120 can use labels associated with each compute cloud that may define the scope of the service (e.g., edge, regional, national). Additionally, placement unit 120 may utilize labels that specify a container runtime (e.g., Kubernetes, Openstack, etc.) to constrain placement of workloads to resources that support the specified container runtime. Further, placement unit may utilize labels that indicate that a network resource includes a smart NIC when workloads in the communication service to be deployed have characteristics indicating that a smart NIC is required (or desirable). Moreover, placement unit 120 can take affinity constraints into account. For example, placement unit may attempt to place a CU in the same cloud (or cloud provider) as a DU.

In some aspects, compute cloud selection screen 360 of FIG. 3G may be an optional part of a workflow. In such aspects, the placement algorithm of placement unit 120 can automatically include compute clouds and data centers that are within the tracking areas selected via tracking area selection screen 340 of FIG. 3E. In some aspects, a user can optionally use compute cloud selection screen 360 to provide a finer grained selection of compute clouds and/or data centers.

In some aspects, placement unit 120 can generate an estimate of costs to the user associated with the communication service to be provisioned. The estimate can be provided the user, and the user can utilize the estimate to determine whether or not to have the communication service deployed by deployment unit 122.

In some aspects, placement unit 120 can determine if there is a feasible placement for the communication service elements that are needed to provision the communication service. If there is such a feasible placement, the placement details can be provided as input to deployment unit 122, which can perform the provisioning of the communication service based on service order 112 and the placement determined by placement unit 120. If there is not a feasible placement for the communication service using the parameter and information gathered by the workflow represented by FIGS. 3A-3G, provisioning portal 104 can inform the user that the communication service cannot be deployed as specified. The user can then return to the screens of FIGS. 3A-3G to modify the parameters so that the feasibility of the communication service with respect to placement of network resources can be redetermined by placement unit 120.

In the example workflow screens shown in FIG. 3E and FIG. 3G, a map view of tracking areas and compute clouds is provided to the user. Additionally, or as an alternative, a list view of tracking areas and compute clouds may be provided.

FIG. 4 is a conceptual view of a user interface screen showing a service order history, according to techniques of the disclosure. In the example illustrated in FIG. 4, service order history screen 402 includes a list 404 of service orders that have been received for processing by deployment unit 122 (FIG. 1). The history of service orders can indicate that the service order has been received but not yet processed, is currently being processed, has completed processing, or failed to be processed.

Figure 5:
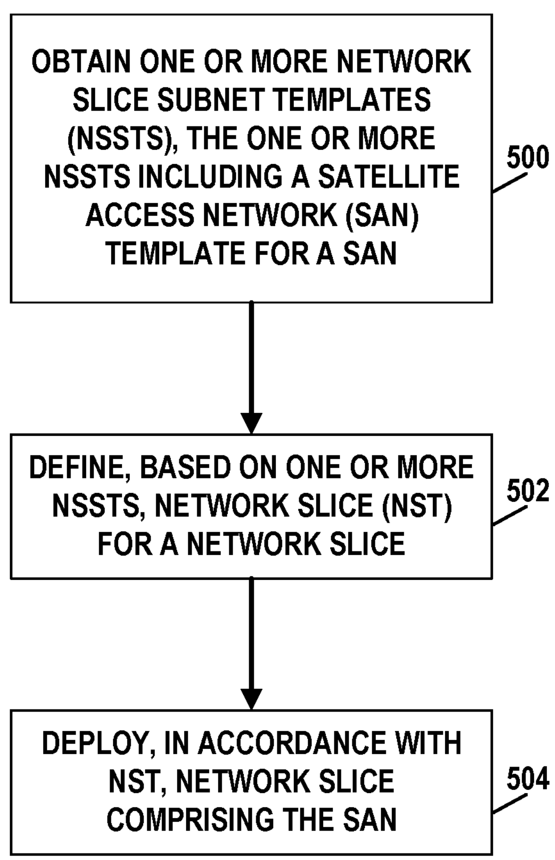
FIG. 5 is a flow chart illustrating operations of a method for provisioning network services, according to techniques of the disclosure.

FIG. 5 is a flow diagram illustrating example operations of a provisioning portal, in accordance with one or more techniques of this disclosure. For convenience, FIG. 5 is described with respect to FIG. 1.

A computing system, such as provisioning system 102 as illustrated in FIG. 1, obtains one or more network slice subnet templates (NSSTs), the one or more NSSTs including a (satellite access network) SAN template for a SAN (500). Provisioning system 102 may obtain an NSST that includes a terrestrial access network (TAN) template for a TAN in addition to the SAN template. Provisioning system 102 may obtain an NSST in response to UI 106 receiving a user input. Provisioning system 102 may obtain the one or more NSSTs from a database such as database 108.

Provisioning system 102 defines, based on the one or more NSSTs, a network slice template (NST) for a network slice (502). Provisioning system 102 may define the NST based on one or more NSSTs stored by provisioning system in database 108. Provisioning system 102, based on user input received via UI 106, may define the NST based on the NSST and one or more components of a communication service.

Provisioning system 102 deploys, in accordance with the NST, a network slice comprising the SAN (504). Provisioning system 102 may deploy the network slice to a SAN that includes one or more satellites. In addition to deploying the slice to the SAN, provisioning system 102 may deploy the network slice to a TAN and to a core network such as core 105.

Figure 6:
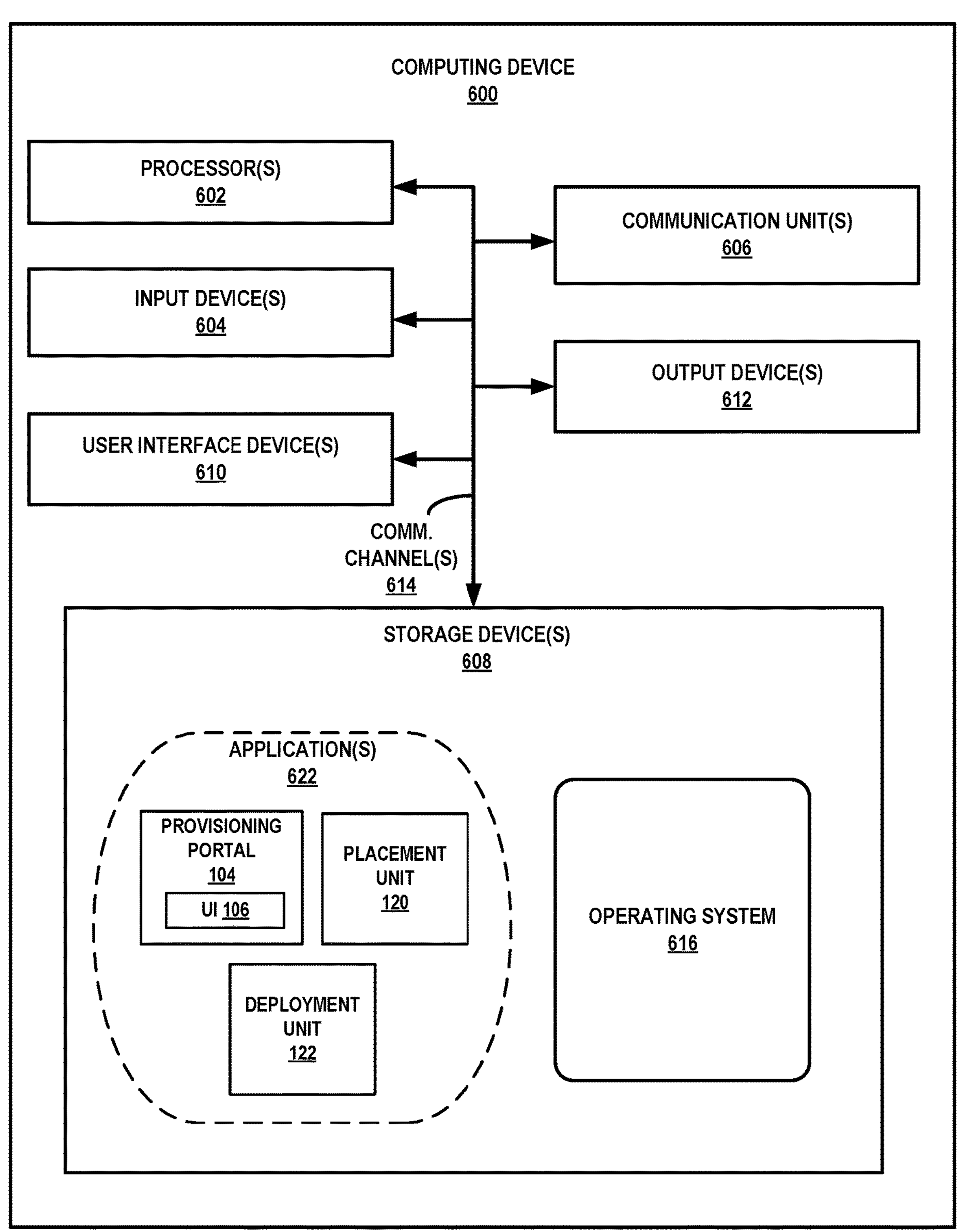
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor (s) 602 for executing any one or more of provisioning portal 104, placement unit 120, deployment unit 122 or any other system, application, node software, or module described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). As shown in the specific example of FIG. 6, computing device 600 includes one or more processors 602, one or more input devices 604, one or more communication units 606, one or more output devices 612, one or more storage devices 608, and user interface (UI) device 610. Computing device 600, in one example, further includes one or more applications 622 and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, a message bus, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be processing circuitry capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622, access network intelligent controller 102 and/or access network agents 624 with processors 602, communication unit 606, storage device 608, input device 604, user interface devices 610, and output device 612.

Application 622 may also include program instructions and/or data that are executable by computing device 600. Example applications 622 executable by computing device 600 may include application and/or other software to implement capabilities described above. For example, applications 622 can include provisioning portal 104, placement unit 120, and deployment unit 122, which may be one or more applications that provide the functionality corresponding to provisioning portal 104, placement unit 120, and deployment unit 122 of FIG. 1.

FIGS. 7A-7G are conceptual views of a user interface screen for provisioning a network service, according to techniques of the disclosure. FIGS. 7A-7G will be discussed in conjunction with some aspects of FIG. 1. In some examples, the user interface screens of FIGS. 7A-7G may be presented by UI 106 of FIG. 1.

Network templates or blueprints are the basic building blocks of network slices for services like private 5G mobile, augmented reality (AR), virtual reality (VR), cloud gaming, massive Internet of Things (MIoT), etc. These templates include the necessary information like constituent network function descriptors (NFDs), network slice subnet templates (NSSTs), network links, configuration, SLA attributes, etc. These slice/slice-subnet templates, along with Global System for Mobile Communications Association (GSMA)

Generic Network Slice Template (GST) or Network Slice Type (NEST) attributes, are used to deploy network slices. Designing network templates or blueprints may become complicated due to the need to handle multiple components, network configurations, and interconnection links. With the onset of 5G and NFV (Network Function Virtualization), there has been a long-standing need in the Telco community for a powerful design studio that provides a capability of designing arbitrary and meaningful network blueprints with topology and feasibility assistance. Other systems may use different visual styles and do not provide drag-and-drop functionality. Such other systems do not support cloud affinity labels for homing and placement for network functions. Additionally, other systems do not have a real-time feedback loop validating the topology and feasibility of a designed template.

In accordance with the techniques of the disclosure, devices, systems, and methods are described that provide a user with the capability to design and manage slice templates or blueprints in an interactive and visual design studio. The system disclosed herein provides a user interface that enables a user to design, modify, and re-define numerous templates, including:

Domain-level Network Slice Subnet Template (NSST). A Domain-level NSST is a group of one or more network function descriptors or NSSTs interconnected in a complex topology for a domain-specific service.

Root-level Network Slice Subnet Template (or end to end Network Slice Template). A Root-level NSST is a group of NSSTs (RAN, Core, Transport Network (TN)) connected to provide an end-to-end service.

The system described herein provides a user interface enables a user to design arbitrary and meaningful network blueprints with topology and feasibility assistance. In some examples, the system as described herein may provide drag-and-drop functionality for designing NSSTs. Additionally, the system described herein may cloud affinity labels for homing and placement for network functions. In some examples, the system described herein may provide a real-time feedback loop validating the topology and feasibility of a designed template.

FIG. 7A is a conceptual view of a user interface screen for adding a slice template for use in provisioning a network service, according to techniques of the disclosure. In some examples, the user interface screen of FIG. 7A may be presented by UI 106 of FIG. 1. The example of FIG. 7A depicts an example wherein UI 106 receives a selection of an NST for a video streaming slice. In some examples, the user interface of FIG. 7A may receive user input selecting one or more components to be included within an NST from multiple lists of components, including a "general" list and a "services" list. In some examples, provisioning system 102 may provide UI 106, which may enable a user to design domain specific NSSTs (e.g., RAN, Core, value-added services). In some examples, UI 106 may receive user input to design end-to-end NSTs using and interconnecting RANs 109 (including SANs 162) and core 105. In some examples, UI 106 may receive user input specifying placement attributes of the network functions. In an example, UI 106 receives user input specifying a cell site placement tag to be added to a CU-CP network function descriptor in a NSST design. Provisioning system 102, based on the placement tag of the network function, reads the tag of the network function and places it on all selected cell sites (satellite and/or terrestrial).

Figure 7B:
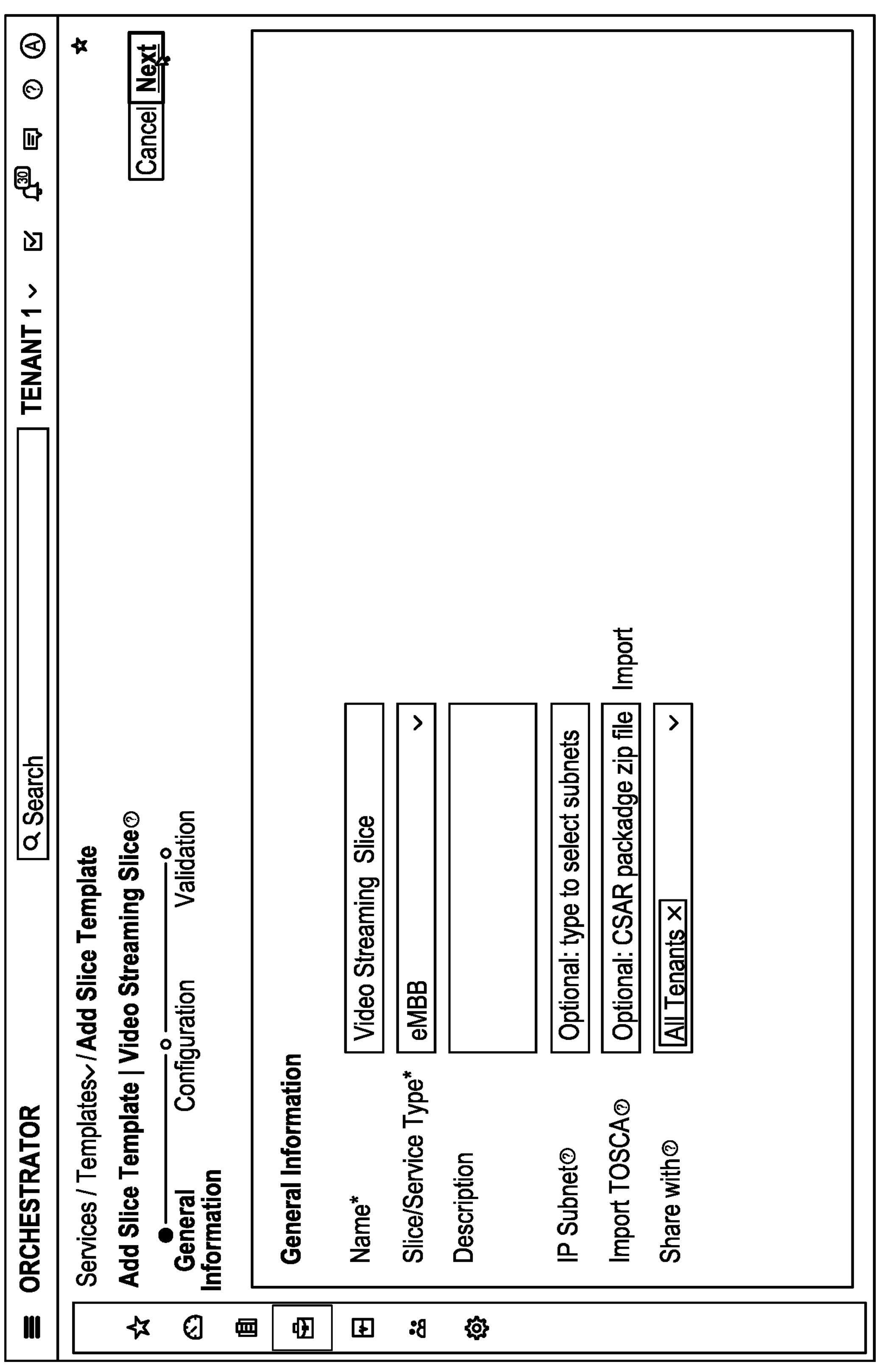

FIG. 7B is a conceptual view of a user interface screen for adding an NST for use in provisioning a network service, according to techniques of the disclosure. In some examples, the user interface screen of FIG. 7B may be presented by UI 106 of FIG. 1. As depicted in FIG. 7B, UI 106 may receive a user selection if one or more characteristics of the slice such as the service type of slice as defined by the NST. In some examples, the user interface of FIG. 7B may enable a user to determine the IP subnet associated with the slice template.

Figure 7C:
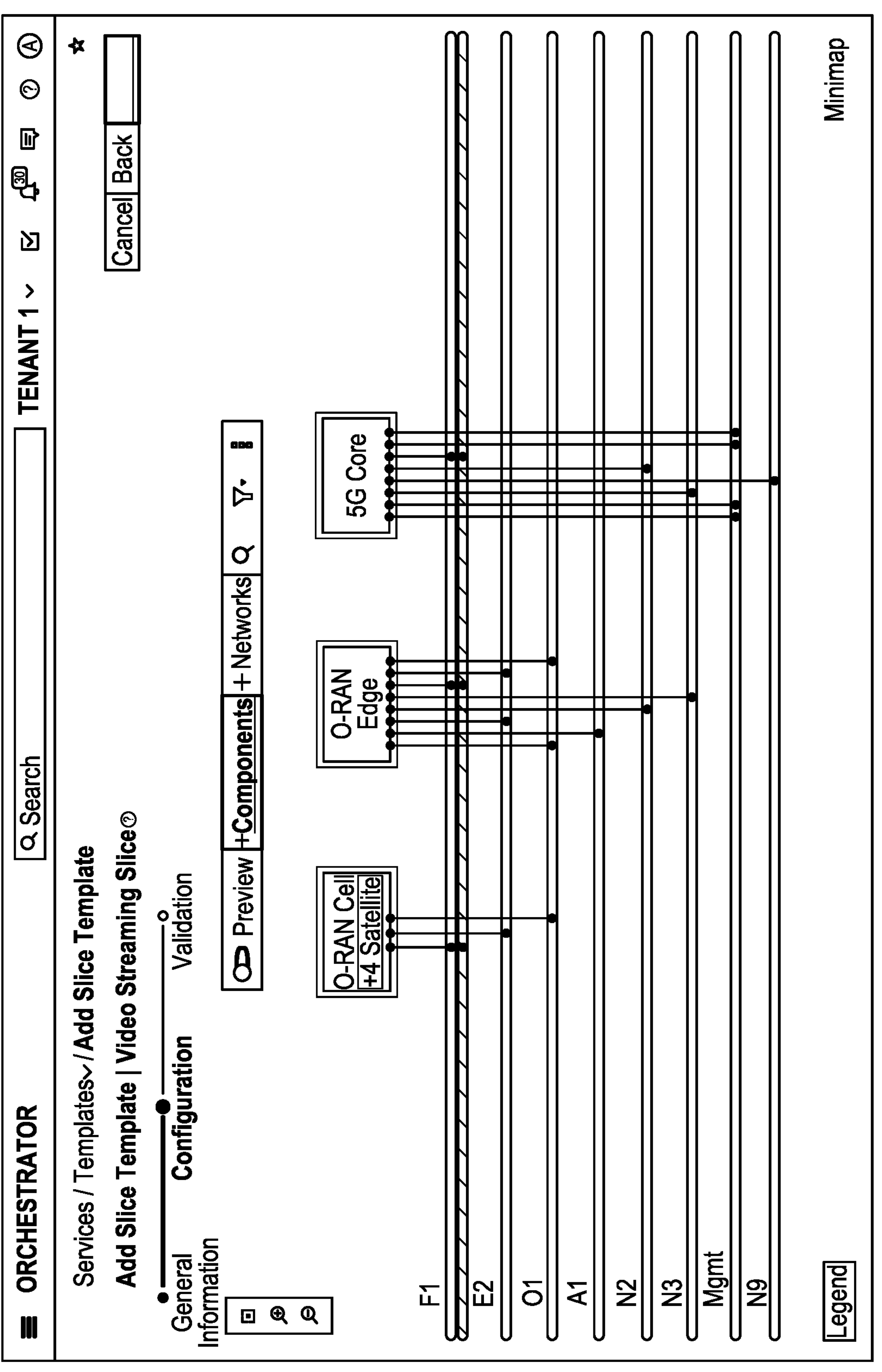

FIG. 7C is a conceptual view of a user interface screen for adding an NST for use in provisioning a network service, according to techniques of the disclosure. In some examples, the user interface screen of FIG. 7C may be presented by UI 106 of FIG. 1. As depicted in FIG. 7C, UI 106 receives a selection from a user indicating one or more components and/or networks to be included within the NST. In some examples, the user interface screen may display visual representations of one or more components such as O-RAN Cells, O-RAN edges, and a 5G core.

Figure 7D:
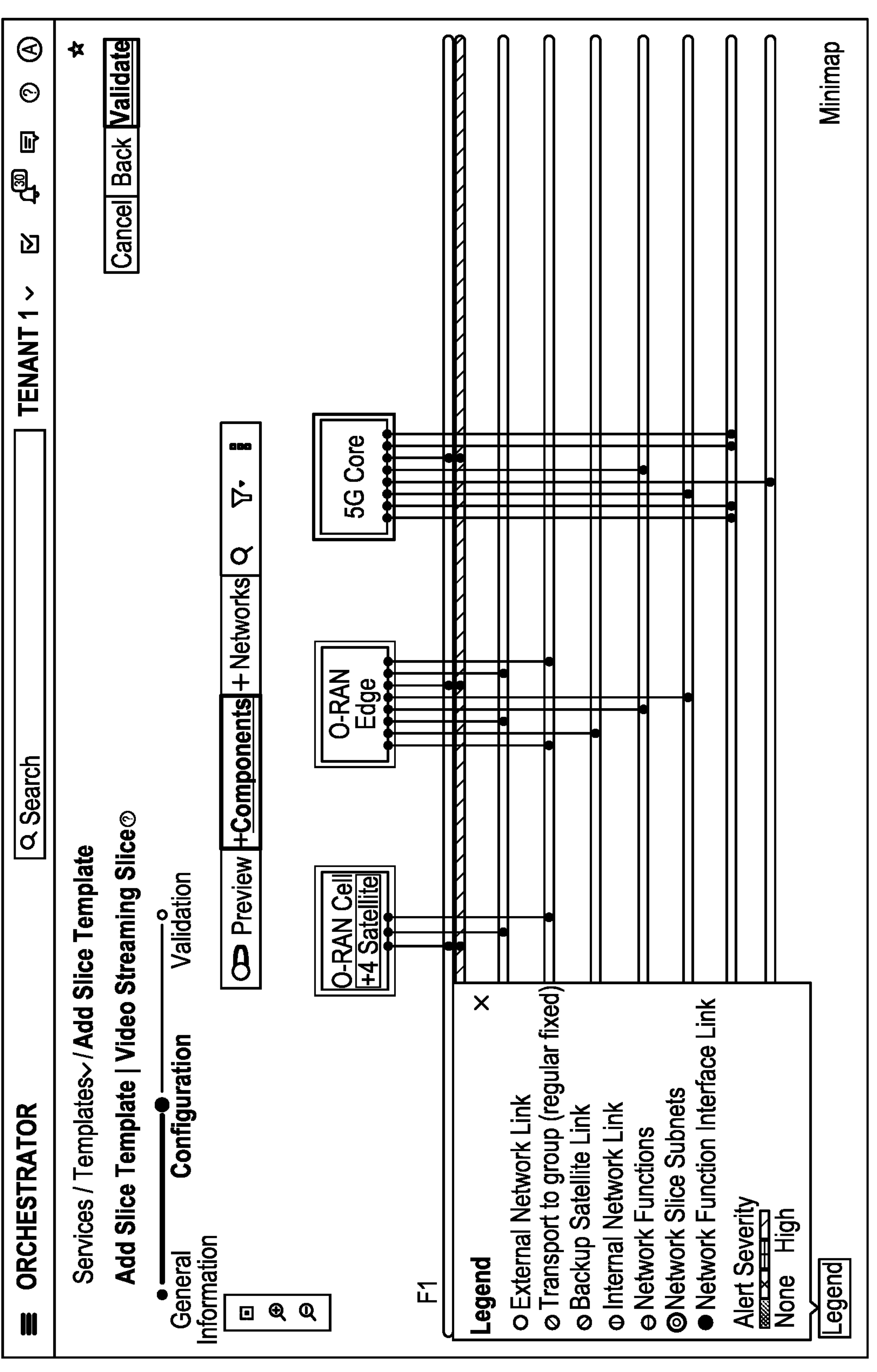

FIG. 7D is a conceptual view of a user interface screen for adding an NST for use in provisioning a network service, according to techniques of the disclosure. In some examples, the user interface screen of FIG. 7D may be presented by UI 106 of FIG. 1. As depicted in FIG. 7D, UI 106 may receive a user selection of one or more components for the NST. In some examples, the user interface screen may display a legend that indicates one or more data points of a NST configuration such as the status of links between components of a network and a network.

Figure 7E:
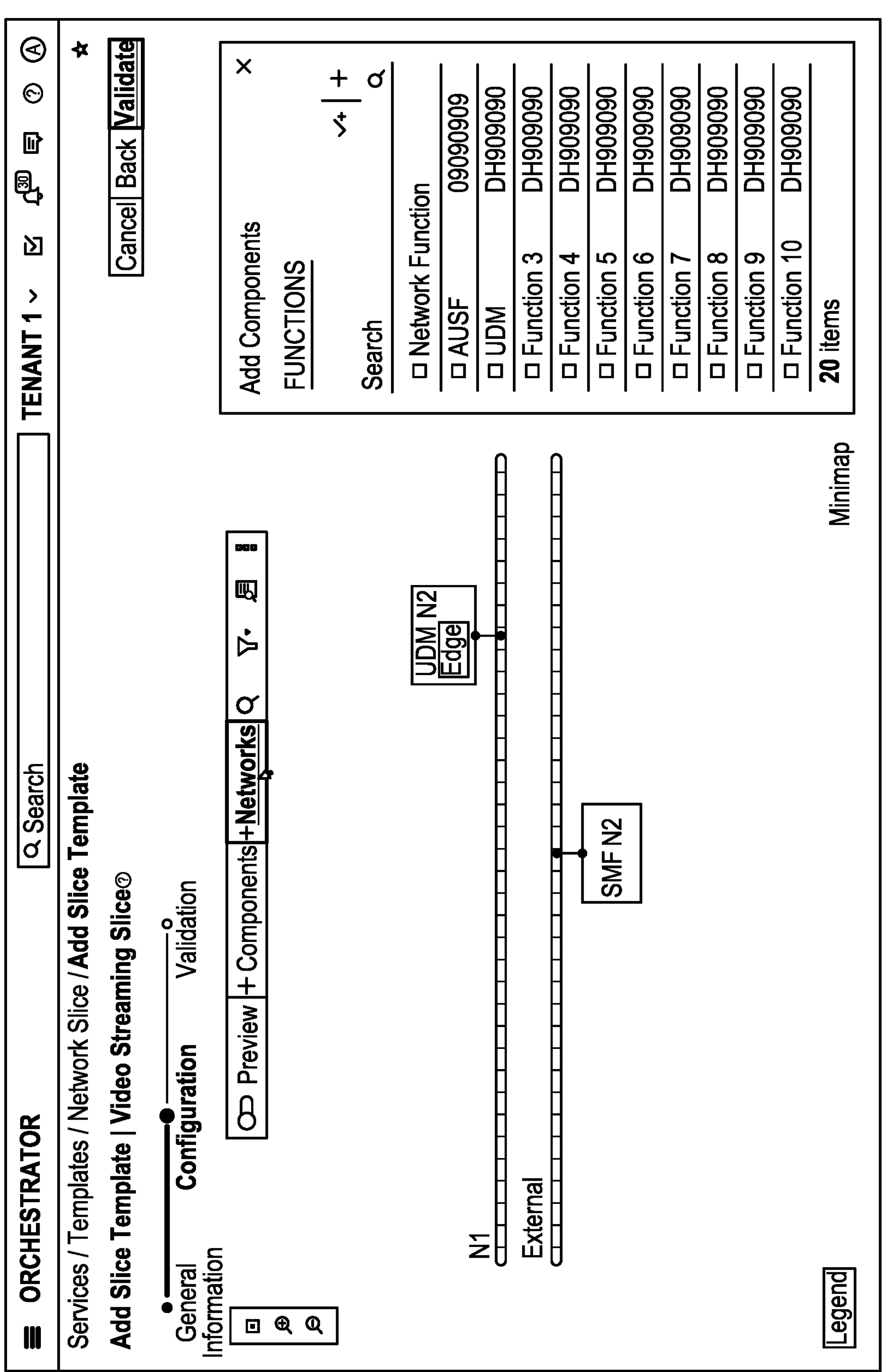

FIG. 7E is a conceptual view of a user interface screen for adding an NST for use in provisioning a network service, according to techniques of the disclosure. In some examples, the user interface screen of FIG. 7E may be presented by UI 106 of FIG. 1. As depicted in FIG. 7E, UI 106 may receive a user selection of one or more networks for the NST. Further, as depicted in FIG. 7E, UI 106 may receive a user configuration one or more network functions and components to an NST.

Figure 7F:
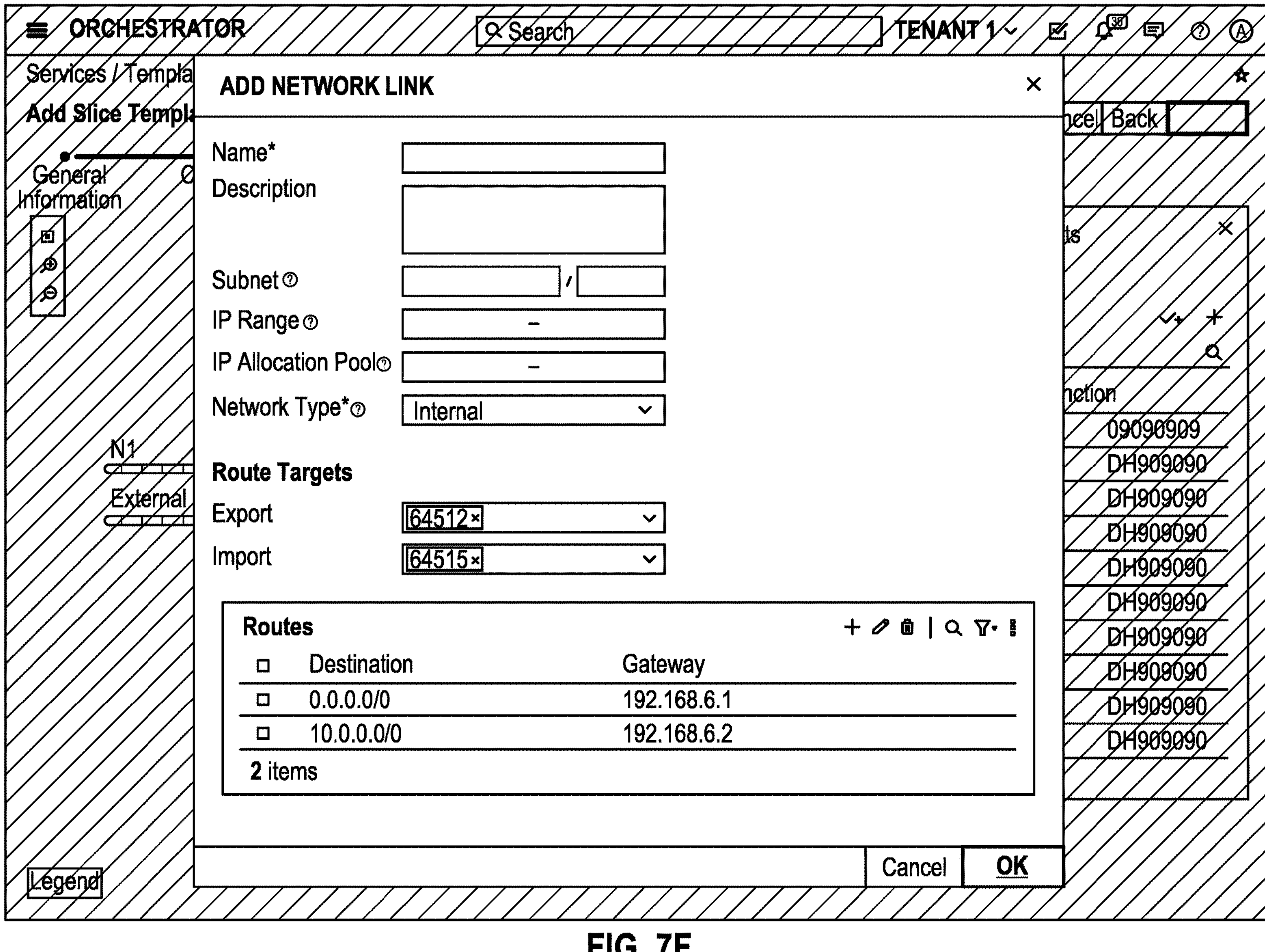

FIG. 7F is a conceptual view of a user interface screen for adding an NST for use in provisioning a network service, according to techniques of the disclosure. In some examples, the user interface screen of FIG. 7F may be presented by UI 106 of FIG. 1. As depicted in FIG. 7F, UI 106 may receive a user input specifying a network link to be added to an NST. In some examples, a user may configure one or more routes of a network.

Figure 7G:
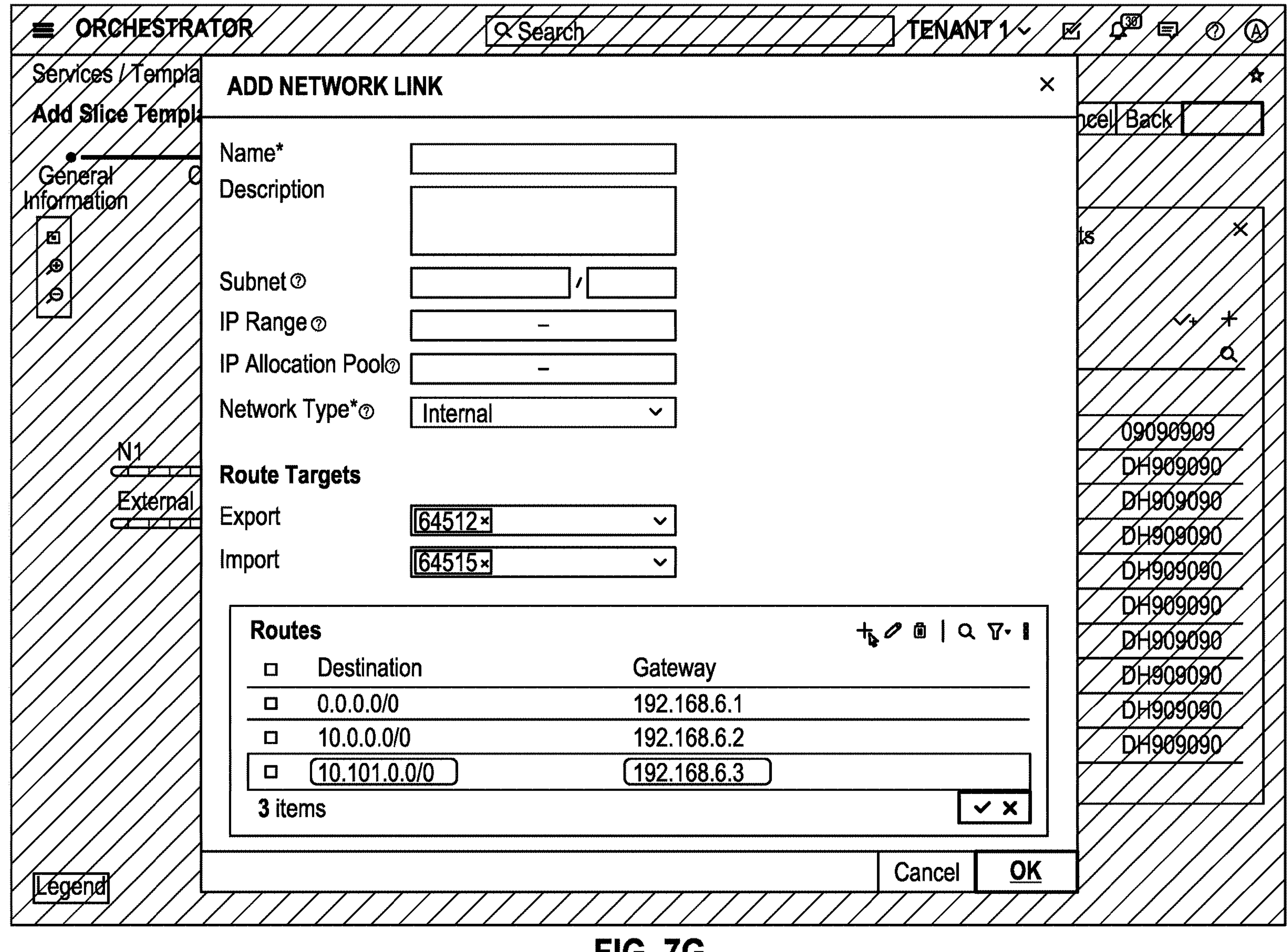

FIG. 7G is a conceptual view of a user interface screen for adding an NST for use in provisioning a network service, according to techniques of the disclosure. In some examples, the user interface screen of FIG. 7G may be presented by UI 106 of FIG. 1. As depicted in FIG. 7G, UI 106 may receive a user selection one or more network routes for an NST. In some examples, a user may select one or more network routes that include export and import targets of a network link, as well as configure one or more attributes of a network link.

FIGS. 8A-8D are conceptual views of a user interface screen for deploying a network service, according to techniques of the disclosure.

Figure 8A:
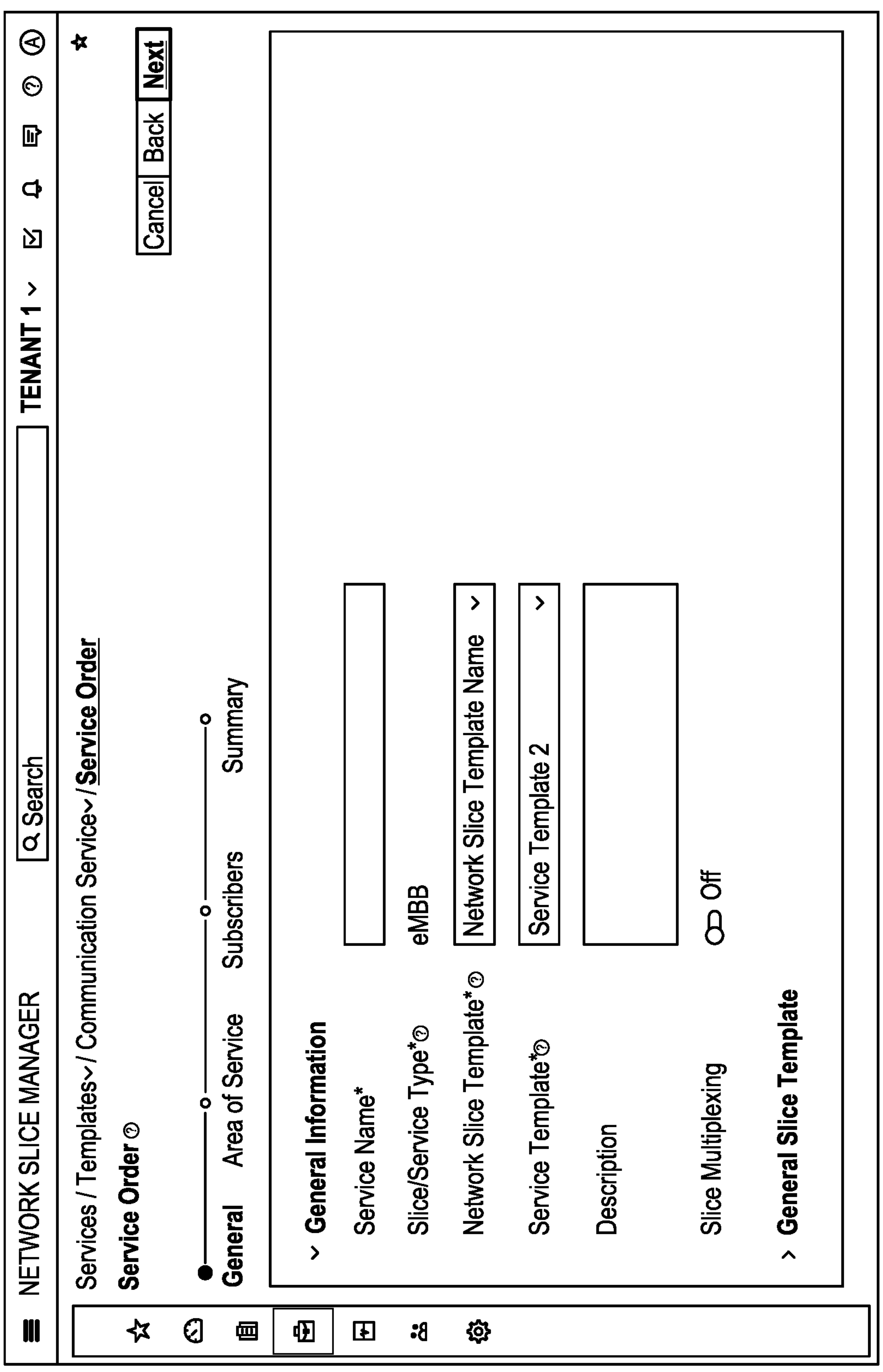
FIGS. 8A-8D are conceptual views of a user interface screen for deploying a network service, according to techniques of the disclosure.

FIG. 8A is a conceptual view of a user interface screen for deploying a network service, according to techniques of the disclosure. Specifically, FIG. 8A depicts a conceptual view of a user interface screen for deploying an NST to a network, according to techniques of the disclosure. In some examples, the user interface screen of FIG. 8 may be presented by UI 106 of FIG. 1. As depicted in FIG. 8A, UI 106 may receive a user configuration of one or more attributes of a service order for deploying a network such as the name of the service, type of service/network slice, the selection of a NST, and other characteristics.

Figure 8B:
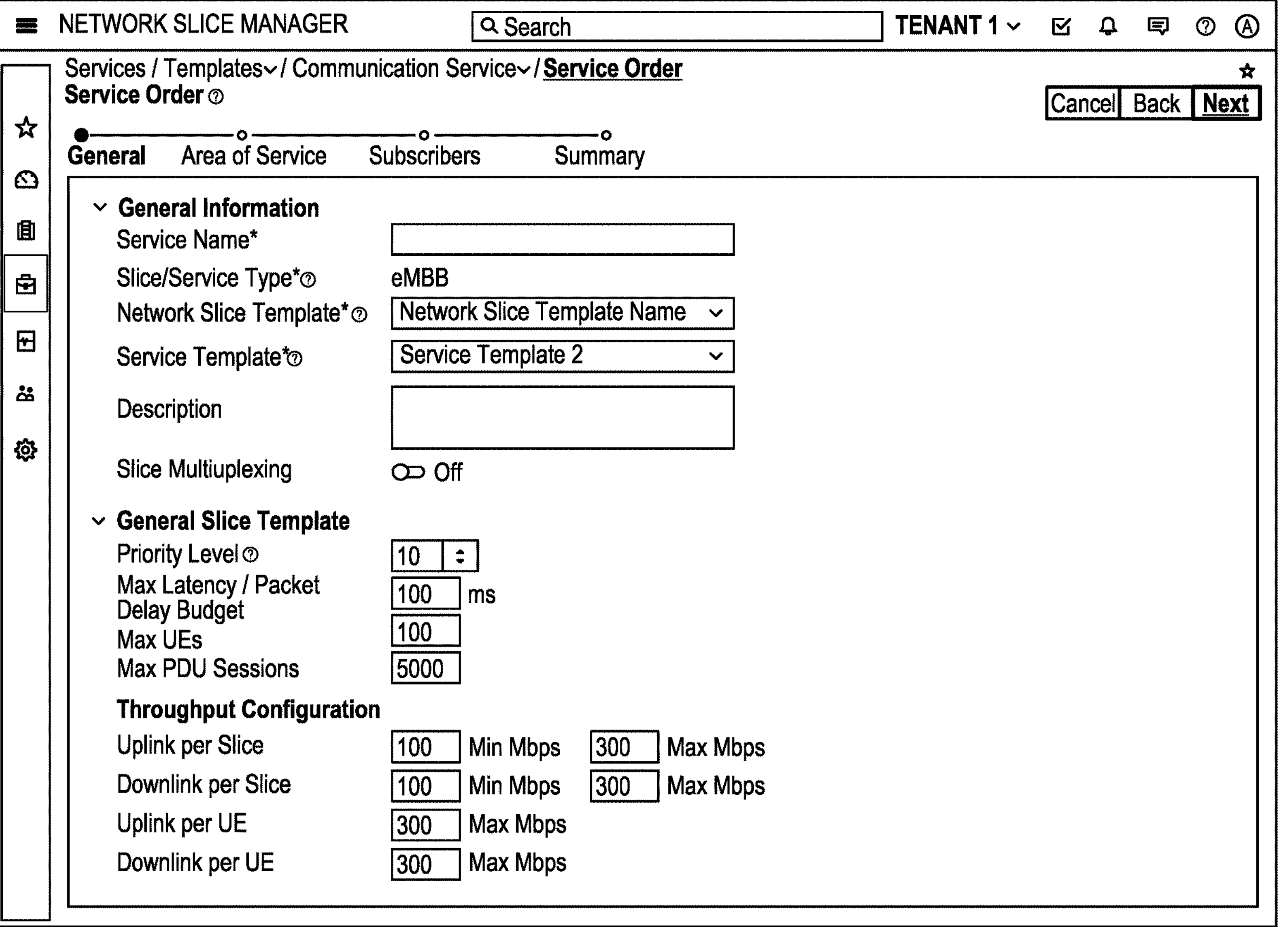

FIG. 8B is a conceptual view of a user interface screen for deploying a network service, according to techniques of the disclosure. Specifically, FIG. 8B depicts a conceptual view of a user interface screen for deploying a network slice to a network. As depicted in FIG. 8B, UI 106 may receive a user configuration of one or more attributes of a network slice that is to be deployed such as attributes of an associated NST, throughput requirements, and other attributes. In some examples, a user can configure attributes of a service order before a network slice is deployed.

Figure 8C:
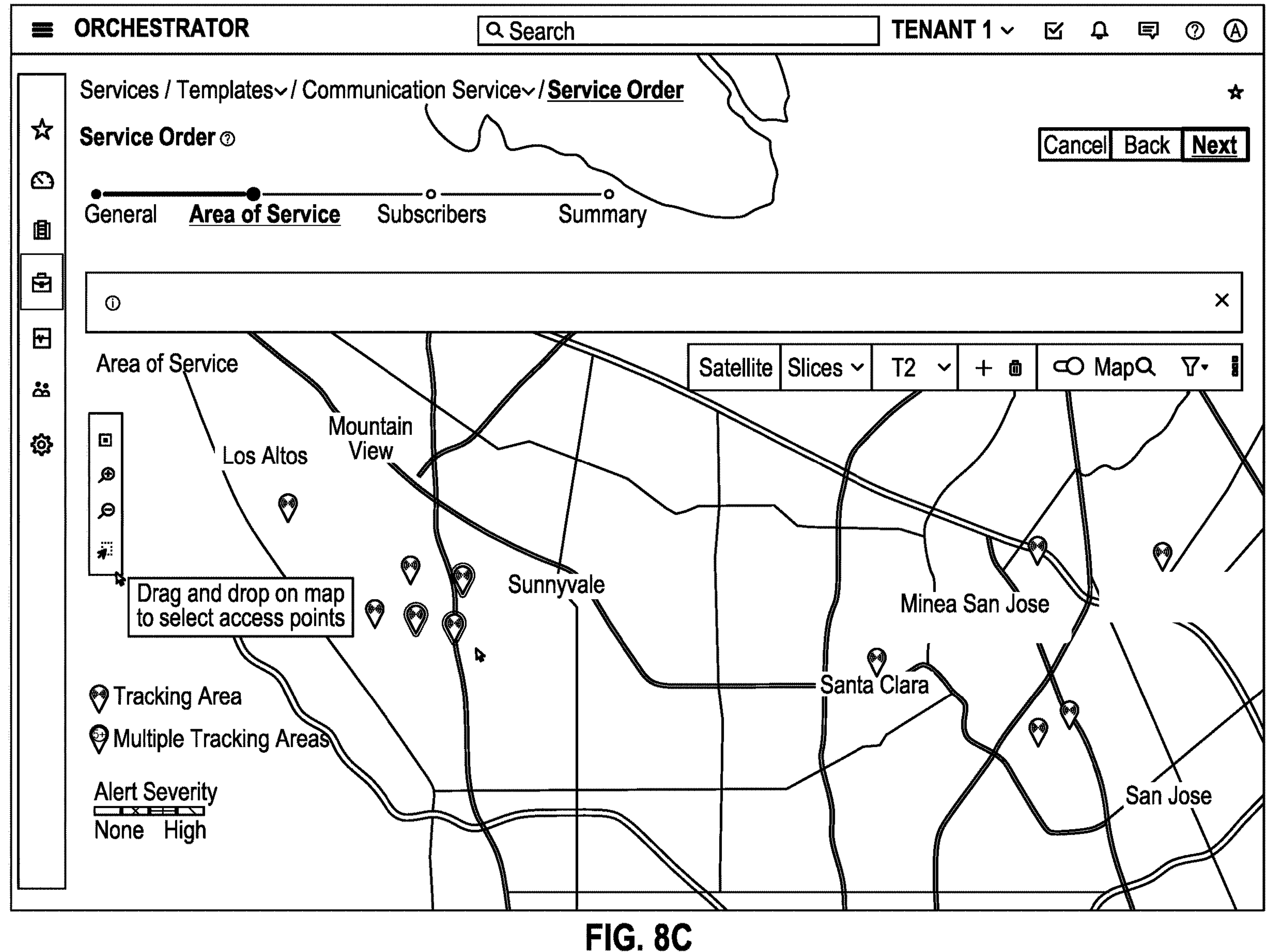

FIG. 8C is a conceptual view of a user interface screen for deploying a network service, according to techniques of the disclosure. Specifically, FIG. 8C depicts a conceptual view of a user interface screen for deploying a network slice to a network. As depicted in FIG. 8C, UI 106 may receive a user configuration of an "Area of Service" for a network slice that includes a selection of satellites and tracking areas of the "Area of Service".

Figure 8D:
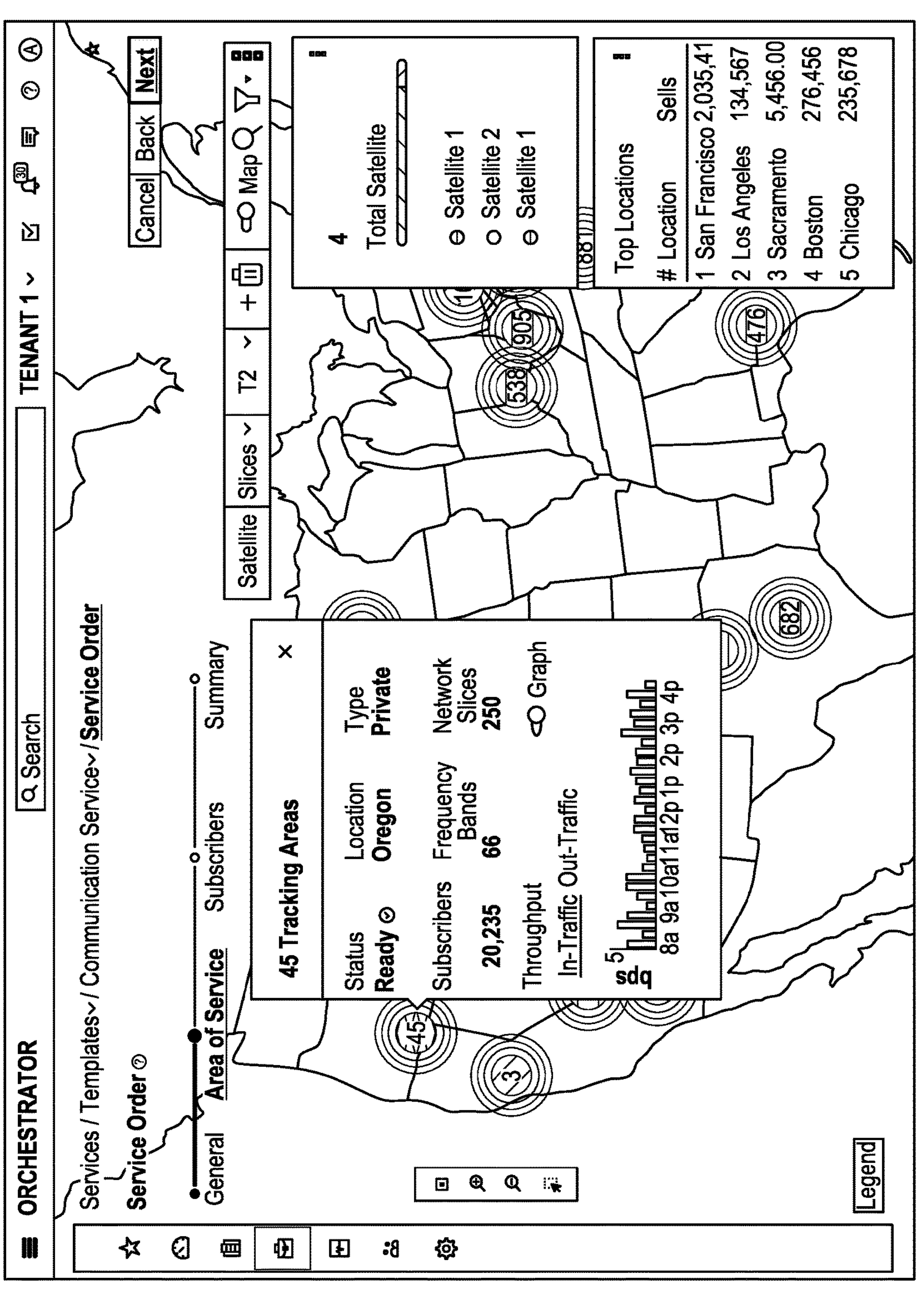

FIG. 8D is a conceptual view of a user interface screen for deploying a network service, according to techniques of the disclosure. Specifically, FIG. 8D depicts a conceptual view of a user interface screen for deploying a network slice to a network. As depicted in FIG. 8D, UI 106 may receive a user configuration the deployment of a network slice across a large geographic area such as a country (e.g., the United States of America) or a political subdivision (e.g., the State of Oregon). In the example of FIG. 8D, a user has selected a UI element representing forty-five network tracking areas in the State of Oregon. The user interface depicted in FIG. 8D includes a UI element that depicts points of data regarding the selected tracking areas in Oregon such as the number of subscribers, historical throughput, network bands, frequency bands, network slices, and the network status (e.g., "Ready").

FIGS. 9A-9D are conceptual views of a user interface screen for maintaining a network service, according to techniques of the disclosure.

In some examples, the user interface screen of FIGS. 9A-9D may be presented by UI 106 of FIG. 1. For convenience, FIGS. 9A-9D are described in reference to FIG. 1.

Figure 9A:
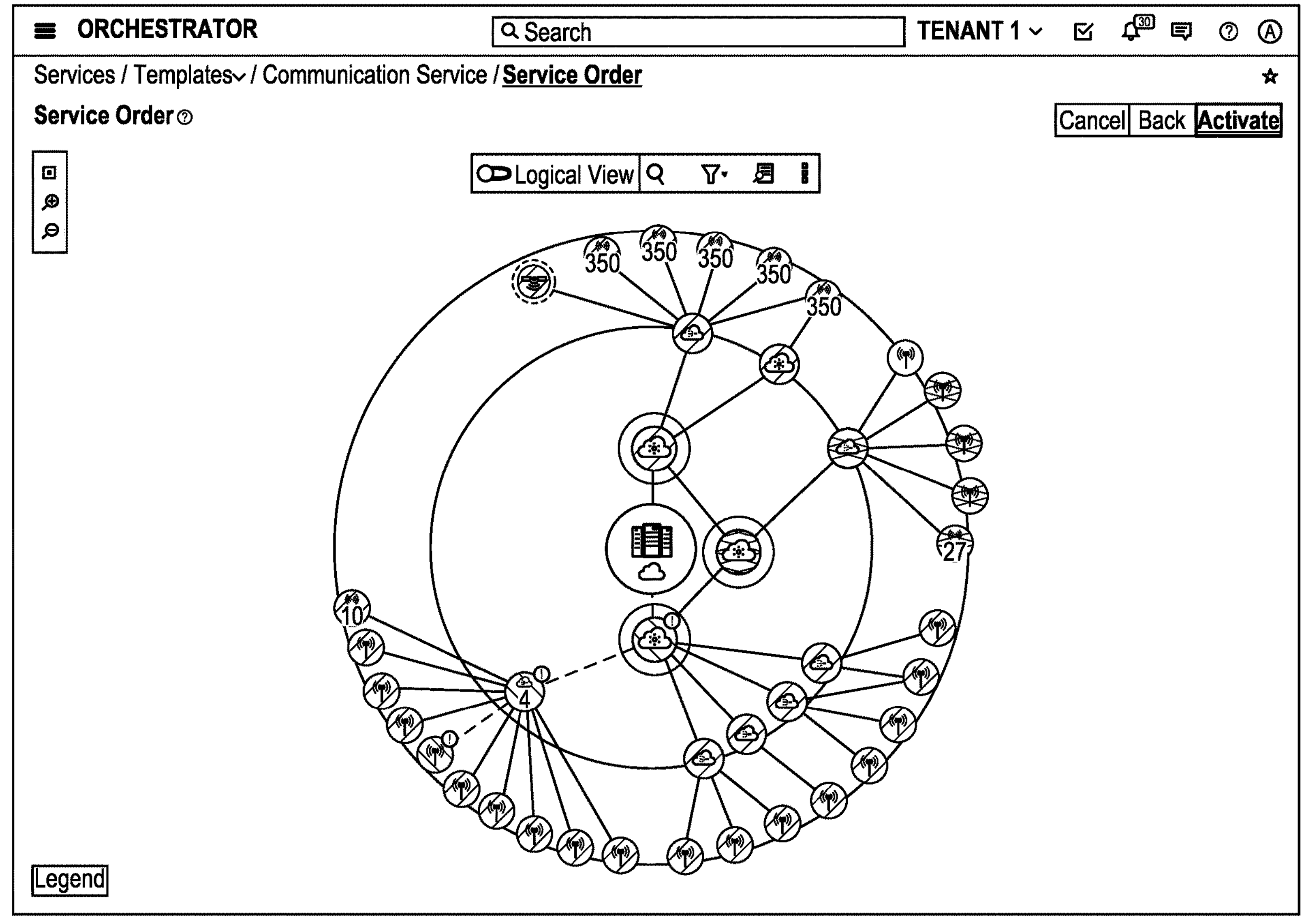
FIGS. 9A-9D are conceptual views of a user interface screen for maintaining a network service, according to techniques of the disclosure.

FIG. 9A is a conceptual view of a user interface screen for maintaining a network service, according to techniques of the disclosure. In the example of FIG. 9A, UI 106 includes an example representation of a network configuration for modification by a user.

Provisioning system 102 may enable a network operator to maintain a network service such as the one illustrated by FIG. 9A. Provisioning system 102 may enable a user, via UI 106, to define an updated NST to remove a particular gNodeB of a SAN such as one of SANs 162. Provisioning system 102, responsive to receiving user input to UI 106 requesting the removal of the particular gNodeB, may modify a network slice deployed to data network 140 based on the updated NST to not include the particular gNodeB.

Provisioning system 102, responsive to user input, may modify a network slice to include a second gNodeB of a SAN of SANs 162 that the network slice is not deployed to. In an example, provisioning system 102, responsive to user input requesting the addition of the second gNodeB to the network slice. Provisioning system 102 may define an updated NST based on the user input, where the updated NST includes the second gNodeB of the SAN.

In some examples, provisioning system 102 may modify a network slice based on user input. Provisioning system 102 may define an updated NST based on the user input, where the updated NST does not include a first gNodeB of the SAN. Provisioning system 102 may modify the network slice based on the updated NST to not include the first gNodeB.

In some examples, provisioning system 102 may modify a network slice by defining an updated NST based on the user input, where the updated NST includes a second gNodeB of the SAN and modify the network slice based on the updated NST to include the second gNodeB. In some examples, provisioning system 102 may output to UI 106, a graphical indicator of the one or more satellites overhead a selected terrestrial location at the first point in time. Provisioning system 102, in response to the deployment of the second NST to the one or more satellites overhead at the first point in time, output to the second user interface a graphical indicator the one or more satellites to which the second NST has been deployed.

Figure 9B:
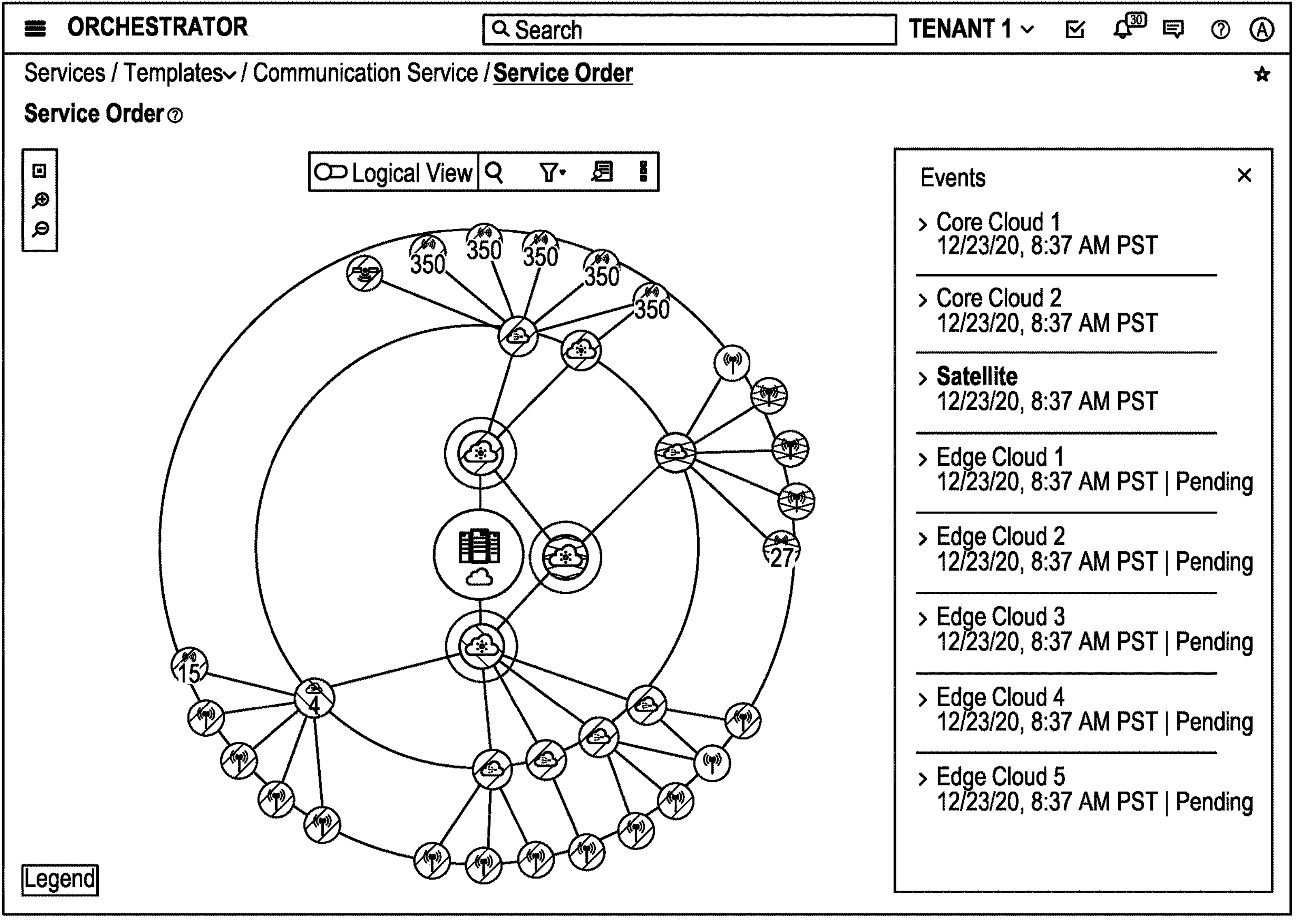

FIG. 9B is a conceptual view of a user interface screen for maintaining a network service, according to techniques of the disclosure. In some examples, UI 106 may include an example representation of a network configuration in addition to a user interface element listing a series of network events.

Figure 9C:
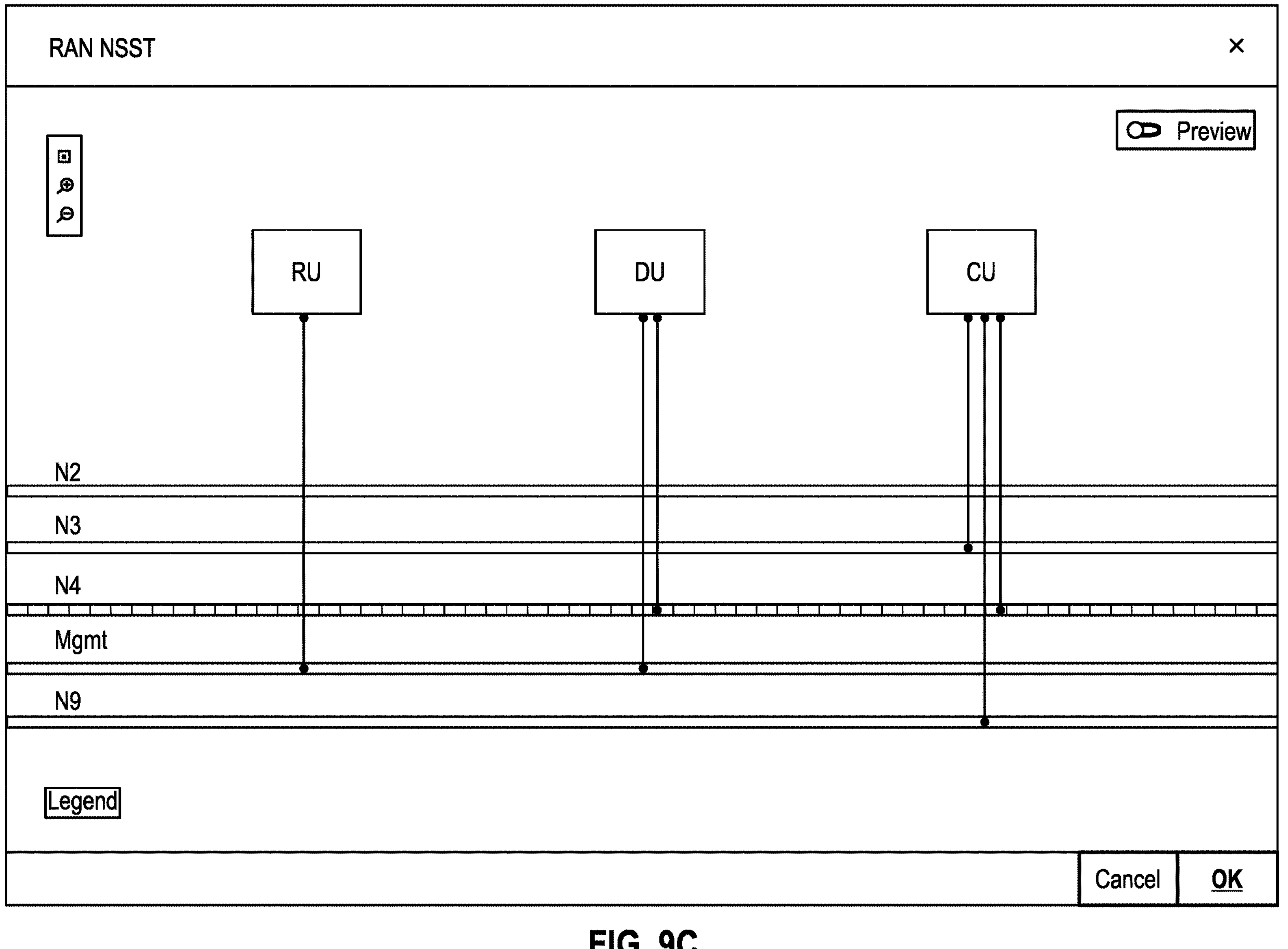

FIG. 9C is a conceptual view of a user interface screen for maintaining a network service, according to techniques of the disclosure. In some examples, UI 106 may depict an example user interface that includes user interface elements corresponding to an RU, a DU, and a CU. In addition, UI 106 may depict, as shown in FIG. 9C, representations of connections between the components (i.e., the RU, DU and CU) and one or more interfaces of a 5G network (e.g., the N2, N3, N4, management., and N9 interfaces).

Figure 9D:
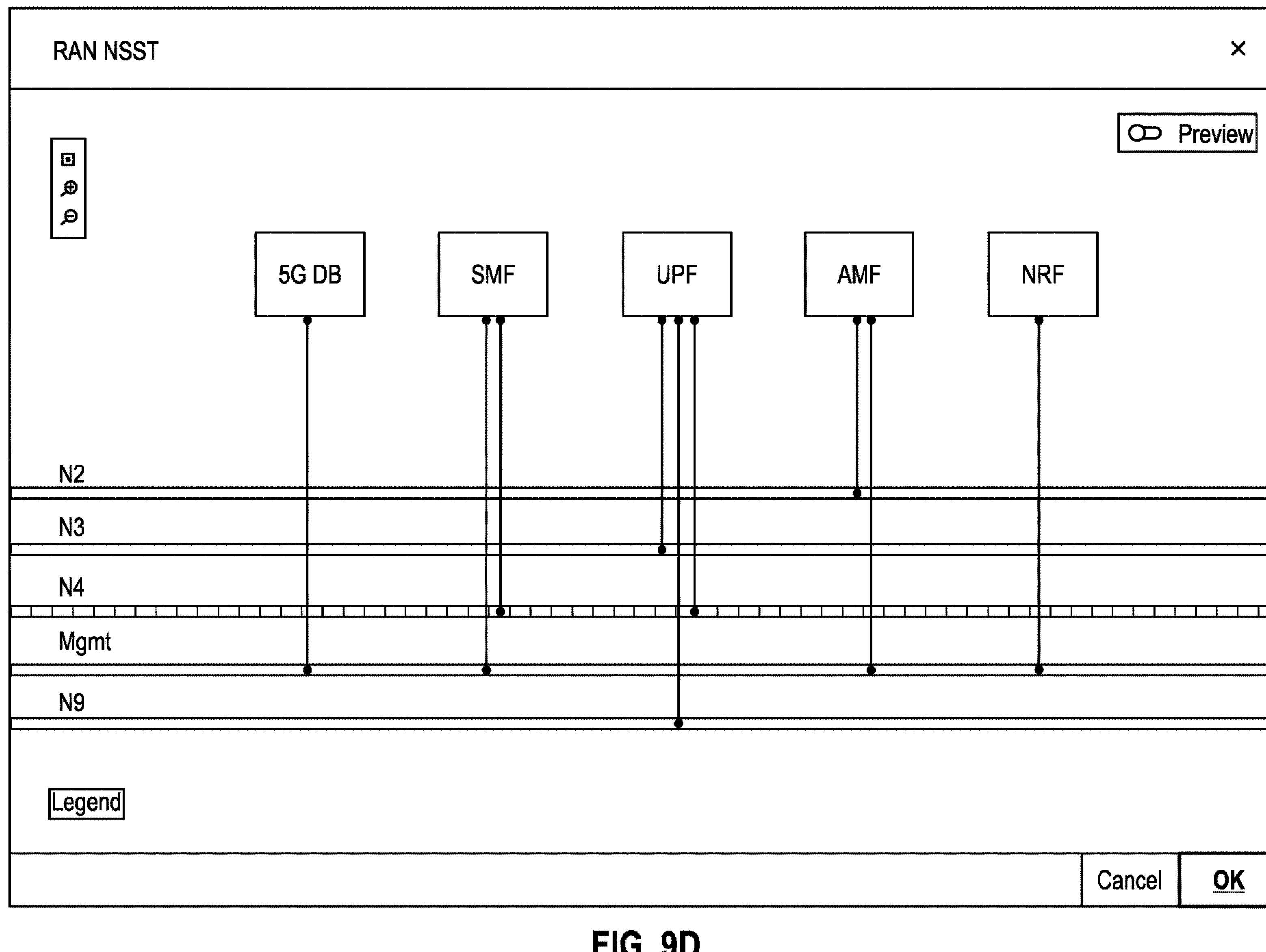

FIG. 9D is a conceptual view of a user interface screen for maintaining a network service, according to techniques of the disclosure. In some examples, UI 106 may depict an example user interface similar to the user interface depicted in FIG. 9C. UI 106 may depict a user interface that includes user interface elements corresponding to components of a 5G network such as a 5G DB, a SMF, a UPF, an AMF, and an NRF and illustrate the connections between the components and one or more interfaces of a 5G network.

Returning to FIG. 1, in some aspects, the screens shown in FIGS. 9A-9D can be used to maintain a communication service provisioned by provisioning system 102. A mobile network operate may use provisioning system 102 to make one or more changes to a deployed communication service. UI 106 may receive user input specifying one or more changes to be made to the deployed communication service.

In some examples, SMO 128 allows users to manage and monitor network slice spanning over satellites and/or terrestrial networks. SMO 128 may enable users, via UI 106 to view and monitor network function instances deployed on satellites. SMO 128 may enable users to see, via UI 106, one or more resource utilization metrics for available and user resources.

Figure 10:
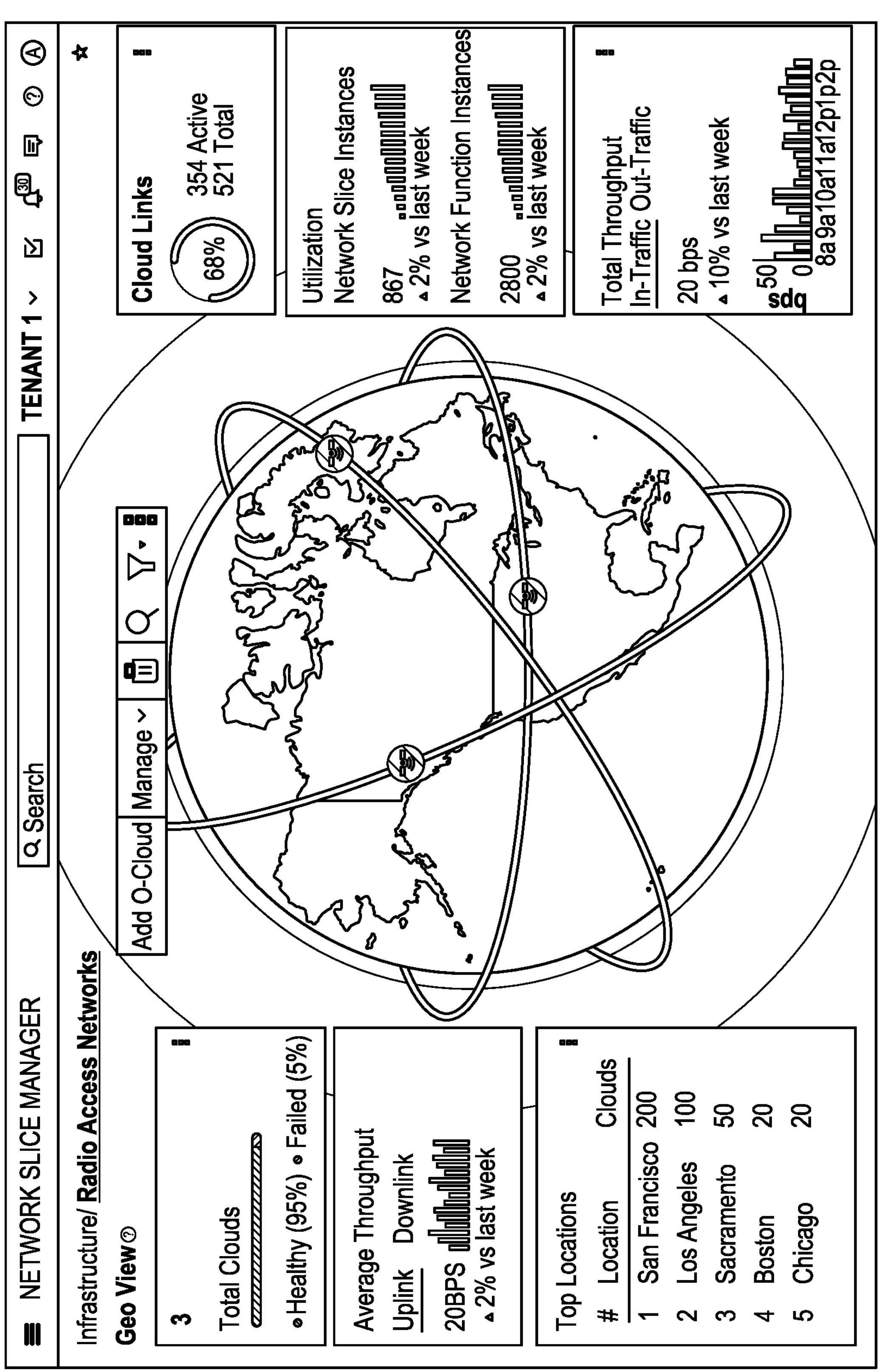
FIG. 10 is a conceptual view of a user interface screen for provisioning a network service, according to techniques of the disclosure.

FIG. 10 is a conceptual view of a user interface screen for provisioning a network service, according to techniques of the disclosure. In some examples, the user interface screen of FIG. 10 may be presented by UI 106 of FIG. 1.

FIG. 10 depicts an example user interface screen, such as one displayed by UI 106, that includes visual elements that represent one or more satellites in orbit. In some examples, UI 106 may depict the example user interface screen as including one or more statuses of a 5G network such as total throughput, cloud links, and other statuses.

Figure 11:
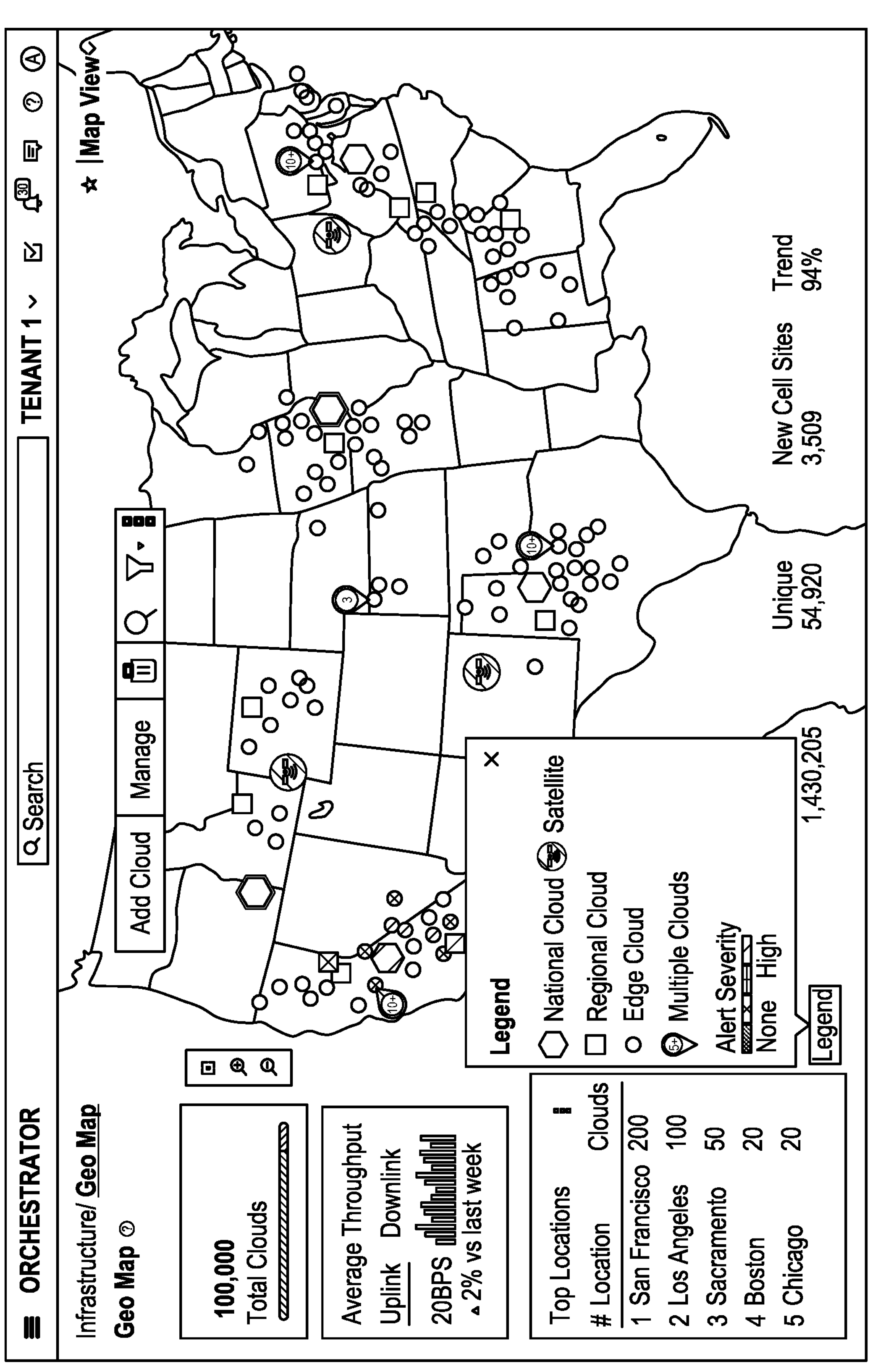
FIG. 11 is a conceptual view of a user interface screen for provisioning a network service, according to techniques of the disclosure.

FIG. 11 is a conceptual view of a user interface screen for provisioning a network service, according to techniques of the disclosure. In some examples, the user interface screen of FIG. 11 may be presented by UI 106 of FIG. 1.

FIG. 11 illustrates an example user interface screen that displays a geographic map overlayed with visual indicators that represent one or more network resources for management by a user. FIG. 11 illustrates the example user interface screen as including visual indicators for network resources such as a national cloud, a satellite, a regional cloud, an edge cloud, and a combination of multiple clouds, and the respective location of each network resource (e.g., a satellite indicated as being overhead northeastern New Mexico). In addition, FIG. 11 illustrates the example user interface screen as including indicators for alert severity of the one or more network resources.

In the example of FIG. 11, a system for provisioning network resources such as provisioning system 102 illustrated by FIG. 1 may cause UI 106 to display the example user interface screen. Provisioning system 102 may cause UI 106 to display an example user interface screen that displays representations of satellites and the respective geographic location that each satellite is overhead.

Provisioning system 102 may determine whether a particular satellite is overhead the service area of a particular network slice as well as whether the service area has ground stations that are capable of providing network services. Provisioning system 102, based on determining that the service does not have ground stations capable of providing network service, may deploy the network slice to the particular satellite overhead the network area.

FIG. 12 is a conceptual view of a user interface screen for provisioning a network service, according to techniques of the disclosure. In some examples, the user interface screen of FIG. 12 may be presented by UI 106 of FIG. 1.

UI 106 may illustrate a user interface screen for provisioning a network service. UI 106 may illustrate an example user interface screen as including a list view of network resources such as 5G cell sites and 5G edge sites. Further, UI 106 may illustrate the list view as including labels for the types of network resource such as container clusters and satellites.

Figure 13:
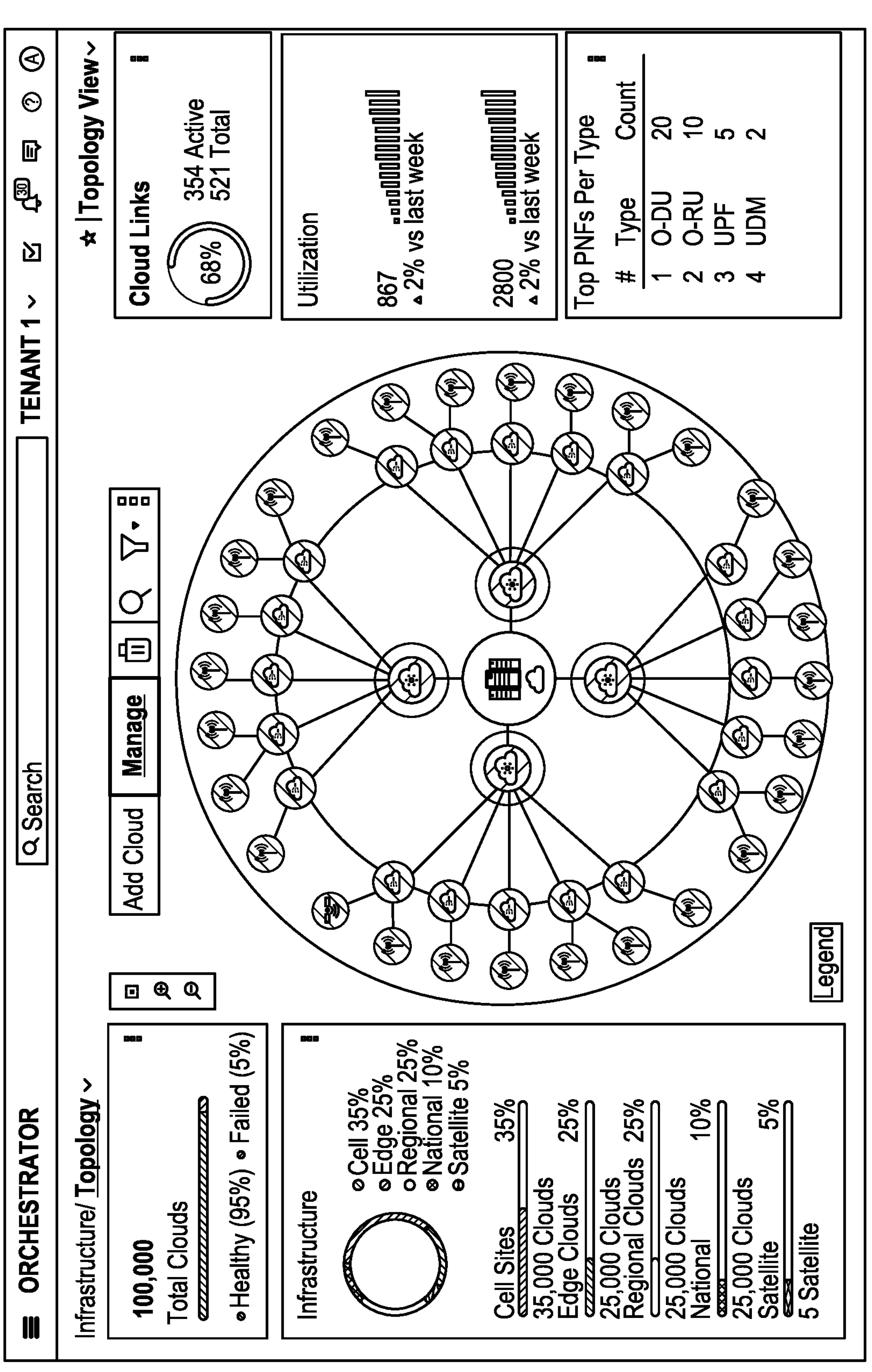
FIG. 13 is a conceptual view of a user interface screen for provisioning a network service, according to techniques of the disclosure.

FIG. 13 is a conceptual view of a user interface screen for provisioning a network service, according to techniques of the disclosure. In some examples, the user interface screen of FIG. 13 may be presented by UI 106 of FIG. 1.

FIG. 13 illustrates an example user interface screen for provisioning a network service that display a visual representation of the topology of a 5G network. UI 106 may illustrate a visual representation of the 5G network topology as a visual tree of connections between different elements of the 5G network. In addition, UI 106 may illustrate an example user interface screen as displaying a variety of statistics of the 5G network (e.g., infrastructure composition, utilization, cloud status, etc.).

The user interface described herein provides a design studio that enables administrators with a simple and streamlined solution to design and configure intent-based slice templates in complex topologies. Using this studio, administrators may combine, connect, and configure network functions, slice subnets, and network links.

As described herein, an administrator may use the design studio provided by UI 106 to create domain-specific slice-subnet templates by importing and interconnecting NFDs and/or other slice-subnet templates using network links (with or without slicing support). For example, an administrator may use the design studio provided by UI 106 to create end-to-end slice templates by importing and interconnecting domain-specific slice-subnet templates (with or without slicing support).

In some examples, the design studio provided by UI 106 may provide a user interface that allows a user to import of virtualized network functions (VNFs), cloud-native network functions (CNFs) (sometimes referred to as containerized network functions), and physical network functions (PNFs) from network function descriptor inventory and pre-designed slice-subnet templates from template inventory. In some examples, the design studio provided by UI 106 may provide a user interface that allows a user to configure network links to interconnect network functions and/or slice-subnet templates. In some examples, the design studio provided by UI 106 may provide a user interface that allows a user to add cloud affinity labels to network functions for homing and placement during deployment. In some examples, the design studio provided by UI 106 may provide a user interface that allows a user to add individual networks and connecting network functions to them using interfaces. In some examples, the design studio provided by UI 106 may provide a user interface that allows a user to zoom in or out. Furthermore, the design studio may provide a "mini-map" capability that illustrates the design as a whole while enabling a user to focus on a particular part of the design.

In some examples, the design studio provided by UI 106 may provide a set of basic pre-designed and configured templates to assist users with template design. In some examples, the pre-designed templates may include a Basic eMBB CN (Core Network) NSST, a Basic eMBB RAN NSST, or a Basic 5G NST, etc. The use of such pre-designed templates may allow users to start from a basic topology and configuration rather than starting from scratch. In some examples, UI 106 enables a user to customize a pre-designed template by adding, removing, or updating network functions, network links, or other configuration, etc., to achieve a desired topology or design.

In some examples, the design studio provided by UI 106 may enable a user to perform real-time template validation of the slice and slice subnet templates. For example, the design studio provided by UI 106 may provide real-time feedback on correctness and feasibility of a template. Therefore, UI 106 may assist a user in identifying misconfiguration and suggest remedies during design time.

In some examples, UI 106 may perform the following steps during design time validation. UI 106 translates a template defined by a user into Topology and Orchestration Specification for Cloud Applications (TOSCA) format. UI 106 sends the template to a validator service. In some examples, UI 106 sends the template to the validator service at regular intervals or when a new component is added or configured. Upon receiving the template, the validator service performs checks and updates the designer view provided by UI 106 with the result. If the validator service identifies an error, UI 106 displays one or more warning icons on each added element with a detected error. Additionally, UI 106 may depict a reason or explanation for each warning.

In some examples, the design studio provided by UI 106 may provide enhanced service qualification and feasibility. For example, UI 106 may enable a slice administrator to perform a service pre-order qualification check to validate technical eligibility and feasibility of a designed template to be deployed on provided infrastructure. As a part of the design workflow, a user may provide GSMA GST/NEST attributes, such as uplink/downlink throughput, area of service, max number of UEs/PDUs, etc. Once the user has designed a template and configured the template with GST attributes, a slice administrator may select, via UI 106, a Validate function wherein a feasibility request for the template is sent to an orchestrator. In response to receiving the feasibility request, the orchestrator creates a deployment plan (homing and placement) and performs eligibility checks with the infrastructure to follow the SLA requirements. The orchestrator sends the results of the feasibility test to UI 106 for display to the user. This workflow provided by the system described herein enables a slice administrator to validate a feasibility of a designed template without real deployment of the slice.

In some examples, UI 106 may depict one or more elements of the network slice, sub-slice, or service designer in one or more colors. In some examples, UI 106 may select one or more colors based on a severity, or may indicate more or less components, networks, network functions, and labels than depicted in the foregoing examples. In some examples, UI 106 may present a visualization using one or more interactive or non-interactive diagrams that depict one or more aspects of network slicing, clouds, or cell towers. In some examples, UI 106 may present dynamic visualizations representing a number of network functions and provide an interface enabling a user to drag-and-drop individual network functions. In some examples, UI 106 may include one or more customizable containers that enable a user to visualize labels or other function details. As described above, UI 106 may provide one or more basic, pre-designed and configured templates to assist a user with template design.

In some examples, UI 106 may provide real-time feedback on a correctness and feasibility of a designed template. Therefore, a slice administrator may perform, via UI 106, a service pre-order qualification check to validate a technical eligibility and feasibility of a designed template to be deployed on provided infrastructure without deploying the template.

In some examples, UI 106 uses Scalable Vector Graphics (SVG) technology and graph layout libraries to allow a user to create configurable and dynamic layouts. The visualization of UI technologies and graph layout libraries as provided by a user interface as described herein was not previously available using other methods. Furthermore, a user interface as described herein may allow a user to customize label details and network details of a template for a network slice, sub-slice, or service.

In accordance with the techniques of the disclosure, UI 106 of provisional portal 104 may provide a user interface enabling a user of client device 101 to perform basic end-to-end network slicing with multi-cloud and multi-domain support (RAN, Transport Network, Core, SGi). The techniques set forth herein may enable UI 106 to provide a Service Designer interface with which a user may design a complete service and network slice and save the designed service and network slice in the database.

Additionally, the techniques set forth herein may enable UI 106 to provide a Slice Designer interface. The Slice Designer interface may use cloud topology information when instantiating network slices to place network slice subnets onto appropriate clouds based on affinity labels (of the clouds vs NSSTs) and the cloud topology information.

In one example, a user, such as an administrator of a network service provider, may, via UI 106, import CNFDs or PNFDs in an NF Catalog, where each NF can have its own placement requirements. For example, each NF may include an "App Descriptor" for use in Label-based CNF placement in a multi-cloud environment. In some examples, the user may define additional NF-specific placement attributes or labels.

In some examples, the user may, via UI 106, design logical NSSTs (e.g. RAN, Core) by grouping domain-specific NFs and/or sub-NSSTs together and connecting them with data plane and control plane logical links. For example, the user may, via UI 106, design a logical RAN NSST composed of RU, DU, CU sub-NSST (CU-UP, CU-CP) and Near-RT RIC with their connectivity requirements).

In some examples, the user may, via UI 106, define additional NF-specific placement attributes or labels. For example, the user may define an attribute for an NSST that requires an NF for the NSST to be placed at an edge. In some examples, UI 106 may automatically determine whether the NF and sub-NSST may cohabit the same cloud and share the same placement criteria, such that the user is not required to make such a determination. UI 106 may thereby enable the user to design a logical NSST with one or more NFs or sub-NSSTs which may or may not share the same placement attributes. Then, at instantiation time, the SMO may determine a best or optimal placement of individual NFs depending on NF-specific user-defined labels, cloud topology, available resources, hardware requirements, SLA requirements, etc. The designed NSSTs are stored in an SMO NSST Catalog of database 108 and made available for inclusion into other NSST or NST designs.

In some examples, the user may, via UI 106, design logical NSTs (end-to-end slices) by combining one or more NSSTs. The designed NSTs are stored in an SMO NST Catalog of database 108 and made available for inclusion into Communication Service Templates.

In some examples, the user defines one or more communication services by combining one or more NSTs with a Service Profile or SLA. The designed CSTs are stored in an SMO CST Catalog of database 108 and made available for ordering.

In some examples, label management elements of UI 106 may be changed to use severity colors, include additional functionality to show more components, or manage network lines, network functions, or labels. In some examples, label management visualization may be used in any interactive and non-interactive diagrams that relate to network slicing, clouds, or cell towers. The label management visualization described herein provides a dynamic way to assign and filter network functions. Furthermore, label-based filtering allows a user to visualize and manage network functions, interfaces, and network links. In some examples, label management uses SVG technology and graph layout libraries to allow configurable and dynamic layouts. The label management techniques described herein, in some examples, includes back-end placement algorithms. This visualization of UI technologies and graph layout libraries provides a user with a mechanism for understanding network slice and network slice subnet deployment which was not previously available.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A system, comprising:

a memory; and processing circuitry in communication with the memory and configured to:

receive a selection of one or more attributes of a network slice, the one or more attributes comprising one or more tracking areas;

obtain one or more network slice subnet templates (NSSTs), the one or more NSSTs comprising:

a first NSST for a satellite access network (SAN), wherein the first NSST specifies (i) one or more satellites for the one or more tracking areas and (ii) configuration information to configure the one or more satellites to operate as at least one of a Distributed Unit (DU), a Centralized Unit (CU), or a combination thereof, of one or more base stations within the one or more tracking areas for the SAN; and a second NSST for a core network, wherein the second NSST specifies (i) one or more network functions within the one or more tracking areas, (ii) one or more network interfaces, (iii) one or more connections between the one or more network functions, the one or more network interfaces, or a combination thereof, and (iv) configuration information for configuring the one or more network functions, the one or more network interfaces, and the one or more connections to implement the core network;

define, based on the one or more NSSTs, a network slice template (NST) for the network slice comprising the SAN and the core network; and deploy, in accordance with the NST, the network slice comprising the SAN and the core network.

2. The system of claim 1, wherein the one or more NSSTs further includes third NSST for a terrestrial access network (TAN), and wherein the processing circuitry is configured to deploy the network slice comprising the SAN, the core network, and the TAN.

3. The system of claim 1, wherein, to deploy the network slice comprising the SAN, the processing circuitry is configured to:

receive a selection of one or more tags;

select, from a plurality of base stations of the SAN and based on the one or more base stations of the plurality of base stations of the SAN having attributes matching the one or more tags, the one or more base stations; and deploy the one or more network functions for the network slice on the selected one or more base stations of the SAN.

4. The system of claim 1, wherein, to obtain the one or more NSSTs, the processing circuitry is configured to:

receive a selection of one or more performance requirements; and select, from a database of a plurality of NSSTs and based on the one or more NSSTs having values matching the one or more performance requirements, the first NSST for the SAN.

5. The system of claim 1, wherein, to obtain the one or more NSSTs, the processing circuitry is configured to execute a user interface configured to:

display a representation of a plurality of NSSTs; and receive, from a user, a selection of the first NSST for the SAN.

6. The system of claim 1, wherein, to deploy the network slice, the processing circuitry is configured to:

deploy, based at least in part on a determination that a satellite of a plurality of satellites of the SAN is proximate to the one or more tracking areas, the one or more network functions for the network slice on the one or more base stations of the satellite of the plurality of the satellites of the SAN.

7. The system of claim 1, wherein the processing circuitry is configured to execute a user interface (UI) configured to display a representation of the network slice comprising the SAN.

8. The system of claim 7, wherein at least one of:

the representation of the network slice further comprises the core network;

the network slice further comprises a terrestrial access network (TAN) and the representation of the network slice further comprises the at least one of the TAN; or a combination thereof.

9. The system of claim 7, wherein the UI is further configured to display a representation of a map of the one or more tracking areas to which the network slice is to be deployed, the representation including one or more icons corresponding to the one or more base stations of the SAN that are proximate to the one or more tracking areas.

10. The system of claim 7, wherein the processing circuitry is configured to receive, via the UI, a selection of one or more satellites of a plurality of satellites of the SAN, and wherein to deploy the network slice, the processing circuitry is configured to deploy the one or more network functions for the network slice on the one or more base stations of the one or more satellites of the plurality of the satellites of the SAN.

11. The system of claim 7, wherein, after deploying the network slice, the processing circuitry is configured to:

receive, via the UI, one of an indication to add a new base station provided by a satellite of a plurality of satellites of the SAN or an indication to remove the new base station provided by the satellite of a plurality of satellites of the SAN; and modify the network slice based at least in part on the selection.

12. A method, comprising:

receiving, by a computing system, a selection of one or more attributes of a network slice, the one or more attributes comprising one or more tracking areas;

obtaining, by the computing system, one or more network slice subnet templates (NSSTs), the one or more NSSTs comprising:

a first NSST for a satellite access network (SAN), wherein the first NSST specifies (i) one or more satellites for the one or more tracking areas and (ii) configuration information to configure the one or more satellites to operate as at least one of a Distributed Unit (DU), a Centralized Unit (CU), or a combination thereof, of one or more base stations within the one or more tracking areas for the SAN; and a second NSST for a core network, wherein the second NSST specifies (i) one or more network functions within the one or more tracking areas, (ii) one or more network interfaces, (iii) one or more connections between the one or more network functions, the one or more network interfaces, or a combination thereof, and (iv) configuration information for configuring the one or more network functions, the one or more network interfaces, and the one or more connections to implement the core network;

defining, by the computing system and based on the one or more NSSTs, a network slice template (NST) for the network slice comprising the SAN and the core network; and deploying, by the computing system and in accordance with the NST, the network slice comprising the SAN and the core network.

13. The method of claim 12, wherein the one or more NSSTs further includes a third NSST for a terrestrial access network (TAN), and wherein deploying the network slice comprises deploying the network slice comprising the SAN, the core network, and the TAN.

14. The method of claim 12, wherein deploying the network slice comprises:

deploying, based at least in part on a determination that a satellite of a plurality of satellites of the SAN is proximate to the one or more tracking areas, the one or more network functions for the network slice on one or more base stations of the satellite of the plurality of the satellites of the SAN.

15. The method of claim 12, further comprising executing, by the computing system, a user interface (UI) configured to display a representation of the network slice comprising the SAN.

16. The method of claim 15, comprising:

receiving, by the computing system and via the UI, a selection of one or more satellites of a plurality of satellites of the SAN, and wherein deploying the network slice comprises deploying the one or more network functions for the network slice on the one or more base stations of the one or more satellites of the plurality of satellites of the SAN.

17. The method of claim 15, wherein the UI is configured to display a representation of a map of the one or more tracking areas to which the network slice is to be deployed, the representation including one or more icons corresponding to the one or more base stations of the SAN that are proximate to the one or more tracking areas.

18. The method of claim 15, after deploying the network slice, comprising:

receiving, by the computing system and via the UI, one of an indication to add a new base station provided by a satellite of a plurality of satellites of the SAN or an indication to remove the new base station provided by the satellite of a plurality of satellites of the SAN; and modifying, by the computing system, the network slice based at least in part on the selection.

19. Non-transitory computer readable storage medium comprising instructions that, when executed, are configured to cause processing circuitry of a computing system to:

receive a selection of one or more attributes of a network slice, the one or more attributes comprising one or more tracking areas;

obtain one or more network slice subnet templates (NSSTs), the one or more NSSTs comprising:

a first NSST for a satellite access network (SAN), wherein the first NSST specifies (i) one or more satellites for the one or more tracking areas and (ii) configuration information to configure the one or more satellites to operate as at least one of a Distributed Unit (DU), a Centralized Unit (CU), or a combination thereof, of one or more base stations within the one or more tracking areas for the SAN; and a second NSST for a core network, wherein the second NSST specifies (i) one or more network functions within the one or more tracking areas, (ii) one or more network interfaces, (iii) one or more connections between the one or more network functions, the one or more network interfaces, or a combination thereof, and (iv) configuration information for configuring the one or more network functions, the one or more network interfaces, and the one or more connections to implement the core network;

define, based on the one or more NSSTs, a network slice template (NST) for the network slice comprising the SAN and the core network; and deploy, in accordance with the NST, the network slice comprising the SAN and the core network.

* * * * *